US008204224B2

(12) United States Patent
Xiao et al.

(10) Patent No.: US 8,204,224 B2
(45) Date of Patent: Jun. 19, 2012

(54) WIRELESS NETWORK SECURITY USING RANDOMNESS

(75) Inventors: Sheng Xiao, Amherst, MA (US); Weibo Gong, Amherst, MA (US)

(73) Assignee: University of Massachusetts, Boston, MA (US)

( * ) Notice: Subject to any disclaimer, the term of this patent is extended or adjusted under 35 U.S.C. 154(b) by 200 days.

(21) Appl. No.: 12/277,225

(22) Filed: Nov. 24, 2008

(65) Prior Publication Data

US 2009/0138715 A1 May 28, 2009

Related U.S. Application Data

(60) Provisional application No. 60/989,924, filed on Nov. 24, 2007.

(51) Int. Cl.
 *G06F 21/00* (2006.01)
(52) U.S. Cl. .......................... 380/260; 380/44; 380/261
(58) Field of Classification Search .............. 380/44–47, 380/259–261
See application file for complete search history.

(56) References Cited

U.S. PATENT DOCUMENTS

| | | | |
|---|---|---|---|
| 6,424,657 B1* | 7/2002 | Voit et al. ....................... | 370/412 |
| 7,233,664 B2* | 6/2007 | Soliman ......................... | 380/44 |
| 2004/0176947 A1* | 9/2004 | Miyake et al. ................. | 704/201 |
| 2006/0126844 A1* | 6/2006 | Mauro ........................... | 380/261 |
| 2006/0256235 A1* | 11/2006 | Nguyen ..................... | 348/415.1 |
| 2008/0273700 A1* | 11/2008 | Wentink ........................ | 380/270 |
| 2009/0055651 A1* | 2/2009 | Girod et al. ................... | 713/176 |

OTHER PUBLICATIONS

Shannon, C.E., "Communication Theory of Secrecy Systems," Bell System Technical Journal, vol. 28, pp. 656-715, 1949, http://netlab.cs.ucla.edu/wiki/files/shannon1949.pdf, last accessed Jan. 7, 2009.
Wyner, A.D., "The Wire-Tap Channel," Bell System Technical Journal, vol. 54, pp. 1355-1387, 1975.
Csiszar, I., et al., "Broadcast Channels with Confidential Messages," IEEE Trans. on Information Theory, vol. 24, pp. 339-348, 1978, http://ieeexplore.ieee.org/stamp/stamp.jsp?arnumber=1055892 &isnumber=22702, last accessed Jan. 7, 2009.
Maurer, U.M., "Secret Key Agreement by Public Discussion from Common Information," IEEE Trans. on Information Theory, vol. 39, pp. 733-742, 1993; http://ieeexplore.ieee.org/stamp/stamp.jsp?arnumber=1055892&isnumber=6498, last accessed Jan. 7, 2009.

(Continued)

*Primary Examiner* — Benjamin Lanier
(74) *Attorney, Agent, or Firm* — Mirick, O'Connell, DeMallie & Lougee, LLP

(57) ABSTRACT

The present invention provides systems and methods for securing communications in a wireless network by utilizing the inherent randomness of propagation errors to enable legitimate users to dynamically create a shared symmetric secret key. In one embodiment, the invention provides a system with two computers each having a wireless network adapter. The sending node encodes the frames, transmits the frames, determines if the frames were correctly received, retransmits the frames if they were not correctly received, stores the frames that were not retransmitted, and uses the stored frames to generate a secret key. The receiving node receives the encoded frames, determines if the frames were retransmitted, stores at least one of the frames that was not retransmitted, and uses the stored frames to generate the same secret key as the receiving node.

14 Claims, 11 Drawing Sheets

OTHER PUBLICATIONS

Ahlswede, R., et al., "Common Randomness in Information Theory and Cryptography, Part I: Secret Sharing," IEEE Trans. on Information Theory, vol. 39, pp. 1121-1132, 1993, http://ieeexplore.ieee.org/stamp/stamp.jsp?arnumber=00243431, last accessed Jan. 7, 2009.

Maurer, U.M., et al., "Secret Key Agreement Over Unauthenticated Public Channels, Part I: Definitions and a Completeness Result," IEEE Trans. on Information Theory, vol. 49, pp. 822-831, 2003, http://ieeexplore.ieee.org/stamp/stamp.jsp?arnumber=01193793, last accessed Jan. 7, 2009.

Maurer, U.M. et al. "Secret Key Agreement Over Unauthenticated Public Channels, Part II: The Simulatability Condition" IEEE Trans. on Information Theory, vol. 49, pp. 832-838, 2003, http://ieeexplore.ieee.org/stamp/stamp.jsp?arnumber=01193794, last accessed Jan. 7, 2009.

Maurer, U.M., et al., "Secret Key Agreement Over Unauthenticated Public Channels, Part III: Privacy Amplification" IEEE Trans. on Information Theory, vol. 49, pp. 839-851, 2003; http://ieeexplore.ieee.org/stamp/stamp.jsp?arnumber=01193795&isnumber=26848, last accessed Jan. 7, 2009.

Denis, M., et al., "Characterizing Spatial Correlation in Indoor Channels," Proc. Wireless Communications Networking Conference, Mar. 2004, Atlanta, Georgia, http://morse.uml.edu/~kchandra/publications/spat_cor_wcnc_04.pdf, last accessed Jan. 7, 2009.

Bloch, M., et al., "Wireless Information-Theoretic Security: Part I: Theoretical Aspects" IEEE Trans. on Information Theory 2006, http://www.dcc.fc.up.pt/~barros/publicaitons/wits-1/bloch-barros-rodrigues-mclaughlin-1.pdf, last accessed Jan. 7, 2009.

Bloch, M., et al., "Wireless Information-Theoretic Security: Part II: Practical Implentation," IEEE Trans. on Information Theory 2006, http://arxiv.org.PS_cache/cs/pdf/0611/0611121v1.pdf, last accessed Jan. 7, 2009.

Xiao, S., et al., "Dense Parity Check Based Secrecy Sharing in Wireless Communications," pp. 54-58 Global Telecommunications Conference Nov. 26-30, 2007, IEEE, Washington, DC, http://ieeexplore.ieee.org/stamp/stamp.jsp?arnumber=04410928, last accessed Jan. 7, 2009.

"Low-density parity-check code," Wikipedia page, available at http://en.wikipedia.org/wiki/Low-density_parity-check_code, printed Feb. 8, 2010, 5 pages.

"Hamming code," Wikipedia page, available at http://en.wikipedia.org/wiki/Hamming_code, printed Feb. 8, 2010, 7 pages.

"Convolutional code," Wikipedia page, available at http://en.wikipedia.org/wiki/Convolutional_code, printed Feb. 8, 2010, 6 pages.

"Dense Parity Check Based Secrecy Sharing in Wireless Communications," Sheng Xiao, Hossein Pishro-Nil, Weibo Gong, IEEE GLOBECOM 2007 Proceedings, 5 pages.

"Low-Density Parity-Check Codes," R.G. Gallagher, IEEE Transactions on Information Theory, 1962, 8 pages.

"On the Practicality of Low-Density Parity-Check Codes," Alex C. Snoeren, MIT Lab for Computer Science, Cambridge, MA, Jun. 27, 2001, 14 pages.

"Hamming code," Wikipedia page, available at http://en.wikipedia.org/wiki/Hamming_code, printed Sep. 21, 2010, 7 p ages.

"Low-density parity-check code," Wikipedia page, available at http://en.wikipedia.org/wiki/Low-density_parity-check_code, printed Sep. 21, 2010, 5 pages.

* cited by examiner

WIRELESS NETWORK SECURITY USING RANDOMNESS

GOVERNMENT RIGHTS

This invention was made with Government support under National Science Foundation grants, contract numbers DMI-0330171 and CNS-0524323. The Government has certain rights in the invention.

FIELD OF THE INVENTION

The present invention relates generally to the field of network security, and more specifically, to secure communications within wireless networks.

BACKGROUND OF THE INVENTION

A wireless network may refer to any type of network that is implemented without the use of hard-wired connections. The term is frequently used to refer to a telecommunications network, such as a computer network or the Internet. One type of wireless network is a Wireless Local Area Network (WLAN), which uses radio signals to transmit data between computers on the same network. Other wireless networks may include mobile device networks, such as the GSM (Global System for Mobile Communications) Network and the PCS (Personal Communications Service) Network.

The use of wireless networks has seen significant growth in public, private, and government sectors in recent years, due in part to their high data rates and convenience of use. However, many data transmissions over wireless networks include confidential information, such as credit card numbers, bank account numbers, and personal medical and financial information. The explosive growth in the implementation of wireless networks underscores the need to protect these sensitive data transmissions.

There are currently many methods and protocols for attempting to secure data transmitted over wireless networks. Most are simply modified or ported versions of the cryptographic techniques used in wired networks. In general however, cryptographic techniques are inevitably vulnerable to the advances in computing power and storage capacity, and the development of novel reversal algorithms.

Two known and widely deployed protocols for wireless network security are Wired Equivalent Privacy (WEP) and Wi-Fi Protected Access (WPA and WPA2). WEP is a scheme used to secure IEEE 802.11 wireless networks, and is part of the IEEE 802.11 wireless networking standard. While WEP was intended to provide a level of security comparable to that of a wired network, there are a number of well known and documented flaws in the cryptographic methods used by WEP, and in WEP itself.

WPA and WPA2 were created as the immediate amendments to overcome the flaws of WEP. While WPA and WPA2 may have stronger encryption, they are not considered as satisfactorily secure and only serve as interim standards for 802.11i, the most up-to-date IEEE wireless LAN security standard. However, implementing 802.11i requires hardware modifications to existing network nodes.

All of the existing wireless LAN security standards require some secrecy to be pre-shared for the establishment of secure communications. This pre-shared secrecy may be, but is not limited to, the use of passcodes or passwords. While it may be feasible to distribute and manage the pre-shared secrecy for a small wireless network, it would be practically impossible to distribute and manage the pre-shared secrecy for wireless nodes in public places or in large scale wireless networks. More generally, the use of a pre-shared secrecy results in a single point of failure, and requires strict ubiquitous trust for all nodes in the network. Any careless operation, such as the leak of a password or a passcode from any node, a delay in upgrading a security-weak node, or an administration flaw, would compromise the security of the entire wireless network.

In contrast to inherently secure wired network systems, such as those implemented with fiber optic cable or coaxial cable, wireless networks are inherently insecure. Specifically, there are four major characteristics of wireless networks that distinguish them from wired networks: (1) the low cost of establishing connectivity to the wireless network; (2) highly dynamic connections between nodes; (3) the low computational capability of any particular node; and (4) the broadcast nature of wireless networks.

As discussed above, the first two characteristics prohibit the use of a static key scheme in a large scale or highly mobile wireless network. The low overhead required for a node to establish connectivity with the wireless network and the highly dynamic connections between nodes rule out the use of complex key distribution methods and make key management very difficult. Further, in contrast to potentially computationally-powerful adversaries, a typical node has limited computational capability. For example, sensor nodes and radio-frequency identification (RFID) devices are generally incapable of performing public key cryptography with a sufficiently long key.

In addition, while wired network systems must be physically tapped to intercept data transmissions, data transmissions in a wireless network are broadcast and may easily be intercepted by an eavesdropper, and such eavesdropping may be more difficult to detect than a physical tap. Further, the broadcast nature of wireless networks enables almost zero-cost eavesdropping, making it further attractive to adversaries.

Wireless networks have additional security requirements as well: (1) provability and testability; (2) providing automatic baseline security without pre-sharing keys; (3) providing dynamic keys without requiring traditional key management efforts; and (4) seamless compatibility with existing wireless devices with a low implementation cost.

The first requirement, provable or information-theoretical security, may be considered the benchmark for wireless security, and is the topic of much current research. The intent behind information-theoretical security is to minimize the uncertainty between legitimate users, while raising the eavesdropper's uncertainty about the agreed-upon security between the legitimate users. In practice, if the security of a wireless network can be shown to be conditionally unbreakable, and if the condition can be tested, the security of a wireless network can be considered provably satisfactory. Testability can be interpreted as the feasibility of actually measuring the level of difficulty in piercing the security barrier.

The next two requirements relate to key generation and management. In a wireless or mobile environment it is usually not possible to predict the communication peers, making the pre-distribution of secret keys often infeasible. Even if the secret keys could be pre-shared, the addition of a new communications node to the environment makes key management extremely difficult. Furthermore, traditional key management requires ubiquitous trust in the key distributor, which may not be possible in mobile and ad-hoc networks that do not have a centralized unit. In addition, the cost of complicated security hardware needed to implement public key cryptography may be prohibitive for many wireless network nodes.

On the other hand, wireless networks have security advantages not present in wired networks. First, communications between nodes in a wireless network primarily require only one hop or step. As a result, an injection or spoofing attack is easier to detect when two nodes are within each others' broadcasting range. Another advantage of a wireless network is the inherent randomness of the communications channel. The physical characteristics of wireless transmission result in non-negligible error rates, which are detected by the receivers. While this randomness is typically seen as a problem to be overcome, the present invention uses this property to provide the secrecy needed for secure communications in a wireless network.

Therefore, while the convenience and cost-saving possibilities of wireless communications are attractive, the security issues are daunting. The current solutions require significant effort and expertise to implement. There is a need in the art, then, for improved methods for securing communications within wireless networks that are provable, testable, and do not rely on the pre-distribution of secret keys or traditional key management efforts. In addition, these systems and methods must work with current wireless devices without incurring significant costs and should not rely on limitations in an eavesdropper's computing power, algorithm knowledge, or storage capacity to provide secure communications.

SUMMARY OF THE INVENTION

The present invention provides systems and methods for securing communications within a wireless network using the inherent randomness of the wireless network. The invention provides a protocol that enables legitimate users to agree on correctly received messages and use these messages to dynamically create shared symmetrical secret keys. In an embodiment, the invention further provides a digital logic module that can be added to existing wireless network nodes.

In typical wireless communication networks, signal to noise ratio (SNR) limitations and complex multipath effects make it difficult to reduce transmission errors. In the area of channel coding, efforts are directed to using redundancy to recover from these transmission errors. The present invention, however, takes the opposite approach, and makes positive uses of the inevitable transmission errors and detectable, but non-correctable, channel coding to implement a shared secret protocol that is provable, testable, and does not require pre-sharing of secret keys. The present invention provides a system that is provably stronger than current computationally-complex wireless security protocols.

In preferred embodiments the present invention provides a computer-implemented method for generating a secret key at a first physical computing device, which is the sending node, in a wireless network. The method comprises encoding one or more frames with dense parity check codes at the sending node; transmitting the frames to a second physical computing device, which is a receiving node; determining if the frames were correctly received at the receiving node; retransmitting the frames to the receiving node if the frames were not correctly received at the receiving node; storing at least one of the frames that was not retransmitted at the sending node; and applying a hashing algorithm to the stored frames to generate a secret key at the sending node. In other aspects, the dense parity check codes used to encode the frames are detectable but not correctable equiprobable parity check codes.

In additional preferred embodiments, the present invention provides a computer-implemented method for generating a secret key at a second physical computing device, which is a receiving node in a wireless network. The method comprises receiving one or more frames encoded with dense parity check codes from a first physical computing device, which is a sending node; determining if the frames were retransmitted by the sending node at the receiving node; storing at least one of the frames that was not retransmitted by the sending node at the receiving node; and applying a hashing algorithm to the stored frames to generate a secret key at the receiving node. In other aspects, the dense parity check codes used to encode the frames are detectable but not correctable equiprobable parity check codes.

In additional preferred embodiments, the present invention provides a computer-implemented method for generating a secret key at a first physical computing device, which is a sending node in a wireless network. The method comprises encoding one or more frames with random string values and error correction codes; transmitting the frames to a second physical computing device, which is a receiving node; determining if the frames were correctly received at the receiving node; retransmitting the frames to the receiving node if the frames were not correctly received at the receiving node; storing at least one random string value from at least one of the frames that was not retransmitted at the sending node; and applying a privacy amplification function to the stored string values to generate a secret key at the sending node.

In additional preferred embodiments, the present invention provides a computer-implemented method for generating a secret key at a second physical computing device, which is a receiving node in a wireless network. The method comprises receiving one or more frames encoded with random string values and error correction codes; determining if the frames were retransmitted by the first physical computing device, which is a sending node; storing at least one random string value from at least one of the frames that was not retransmitted by the sending node at the receiving node; and applying a privacy amplification function to the stored string values to generate a secret key at the receiving node.

In additional preferred embodiments, the invention provides a system for generating a shared secret key at two or more physical computing devices, which are nodes in a wireless network. The system comprises a first node for encoding one or more frames with dense parity check codes, transmitting the frames, determining if the frames were correctly received, retransmitting the frames if the frames were not correctly received, storing at least one of the frames that was not retransmitted, and applying a hashing algorithm to the stored frames to generate a first secret key. The system further comprises a second node for receiving the one or more encoded frames, determining if the frames were retransmitted, storing at least one of the frames that was not retransmitted, and applying the hashing algorithm to the stored frames to generate a second secret key, where the first secret key and the second secret key are the same.

In additional preferred embodiments, the invention provides a system for generating a shared secret key at two or more physical computing devices, which are nodes in a wireless network. The system comprises a first node for encoding one or more frames with random string values and error correction codes, transmitting the frames, determining if the frames were correctly received, retransmitting the frames if the frames were not correctly received, storing at least one of the frames that was not retransmitted, and applying a privacy amplification function to the stored frames to generate a first secret key. The system further comprises a second node for receiving the one or more encoded frames, determining if the frames were retransmitted, storing at least one of the frames that was not retransmitted, and applying the privacy amplification function to the stored frames to generate a second secret key, where the first secret key and the second secret key are the same.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DEFINITIONS

Figure 1:
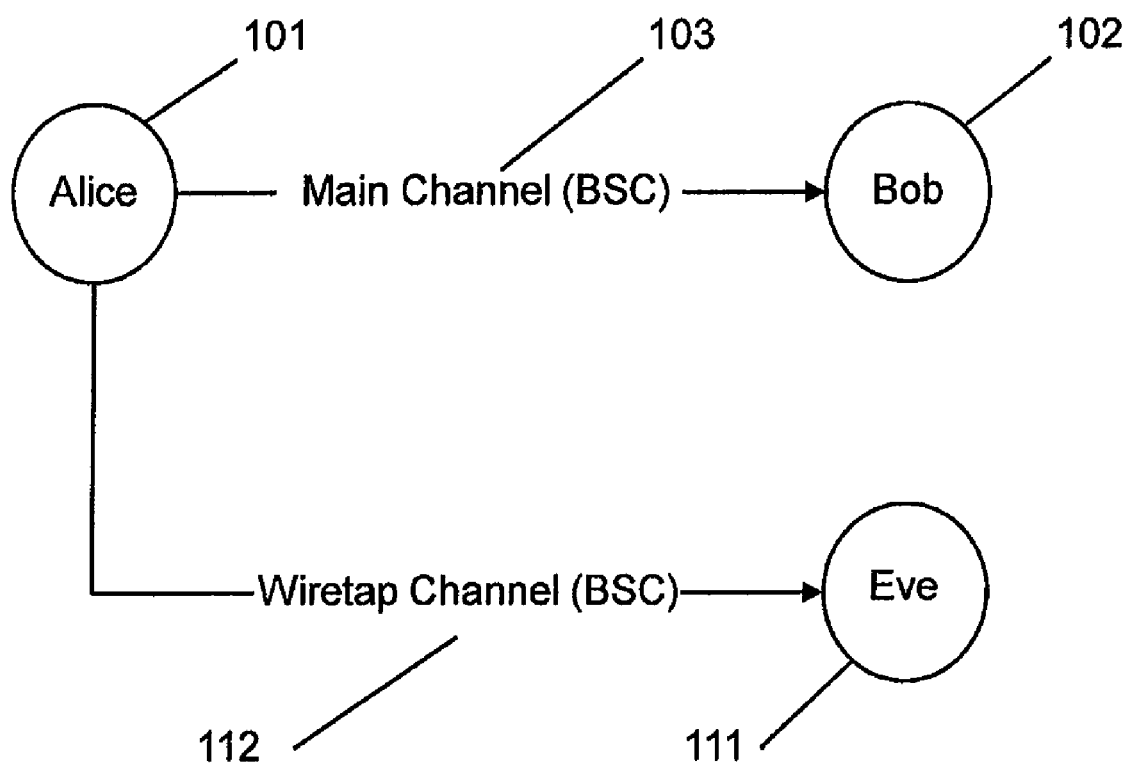
FIG. 1 is a block diagram of the prior art wiretap channel model.

The following terms used in this specification are defined as follows:

As used herein, Automatic Repeat reQuest (ARQ or Automatic Repeat-Query) is an error control method for data transmission that uses acknowledgements and timeouts to achieve reliable data transmission. An acknowledgement (ACK) is sent by the receiver to the transmitter or sender to indicate that it has correctly received a data frame or packet. A timeout is a point in time after the transmitter sends the data frame or packet. If the transmitter does not receive an acknowledgment before the timeout, the transmitter typically resends the data frame or packet until it receives an acknowledgement or exceeds a predefined number of re-transmissions. There are many versions of ARQ, including but not limited to Stop-and-wait ARQ, Go-back-N ARQ, and Selective Repeat ARQ. As used herein, Stop-and-wait ARQ is a form of ARQ, where the transmitter or sender sends one data frame or packet at a time. After sending the frame or packet, the transmitter does not send any further frames until it receives an acknowledgement (ACK) from the receiver. If the transmitter does not receive the ACK before a timeout period expires, the transmitter sends the same frame again.

As used herein, channel coding is the branch of mathematics and computer science that deals with the error-prone process of transmitting data across noisy channels.

As used herein, channel fading or Rayleigh fading is a statistical model for determining the effect of a propagation environment on a radio signal, such as one used by wireless nodes.

As used herein, cyclic redundancy check (CRC) is a type of function that takes as input a data stream of any length, and produces as output a value of a certain space, commonly a 32-bit integer. The term CRC denotes either the function or the function's output. A CRC can be used as a checksum to detect accidental alteration of data during transmission or storage.

As used herein, $GF(2^n)$ denotes a Galois field containing $2^n$ elements, wherein n is greater than 1. The Galois field is a number system in which there are $2^n$ elements and in which the rules of addition and multiplication correspond to arithmetic modulo an irreducible polynomial of degree n with coefficients in $G(2)$, $G(2)$ being a number system in which the only elements are the binary numbers 0 and 1 and the rules of addition and multiplication are: $0+0=1+1=0$; $0+1=1+0=1$; $0\times 0=1\times 0=0\times 1=0$; $1\times 1=1$. The conventional approach to performing operations in $GF(2^n)$ involves choosing a polynomial $P(x)$ of degree n which is irreducible over $GF(2^m)$, $m<n$ defining an element $\alpha$ in $GF(2^n)$ as a root of $P(x)$—satisfying $P(\alpha)=0$—and assigning the unit vectors of length n with binary components to the elements $1, \alpha, \alpha^2, \ldots, \alpha^n-1$.

As used herein, a hashing algorithm is defined as an algorithm that, when applied to the information content of a variable length message, produces a fixed-length string called a hash value or hash.

As used herein, multiple-input and multiple-output (MIMO) is defined as the use of multiple antennas at both the transmitter and receiver to improve the performance of radio communication systems.

As used herein, multipath is the propagation phenomenon that results in radio signals reaching the receiver by two or more paths. Multipath effects include constructive and destructive interference, and phase shifting of the signal.

As used herein, the complexity class NP-complete (NP-C or NPC) is a class of problems having two properties. First, any given solution to the problem can be verified quickly, in polynomial time. The set of problems with this property is called NP. Second, if the problem can be solved quickly in polynomial time, then so can every problem in NP. In computational complexity theory, polynomial time refers to the computation time of a problem where the run time, m(n), is no greater than a polynomial function of the problem size, n.

As used herein, public key cryptography, also known as asymmetric cryptography, is a form of cryptography in which the key used to encrypt a message differs from the key used to decrypt it. In public key cryptography, a user has a pair of cryptographic keys—a public key and a private key. The private key is kept secret, while the public key may be widely distributed. Incoming messages would have been encrypted with the recipient's public key and can only be decrypted with his corresponding private key. The keys are related mathematically, but the private key cannot be practically derived from the public key.

As used herein, signal to noise ratio (SNR) is the ratio of a signal power to the noise power corrupting the signal.

A used herein, a spoofing attack is a situation in which one person or program successfully masquerades as another by falsifying data and thereby gaining an illegitimate advantage.

DETAILED DESCRIPTION OF THE INVENTION

The present invention provides computer-based systems and computer-implemented methods for securing communications within a wireless network by utilizing the inherent randomness of wireless networks. The invention provides protocols that enable legitimate users to agree on correctly received messages and use these messages to create shared secret keys. In additional embodiments, the invention provides a digital logic module that can be added to existing wireless nodes.

1. The Theoretical Research

C. E. Shannon, in "Communication theory of secrecy systems," *Bell System Technical Journal*, vol. 28, pp. 656-715, 1949, was the first to study communication security from the information theory perspective. Shannon's source coding theorem states that, on average, the number of bits needed to represent the result of an uncertain event is given by its entropy. Shannon's noisy-channel coding theorem states that reliable communication over noisy channels is possible if the rate of communication is below a certain threshold called the channel capacity.

Applying Shannon's theorems, a message M may be encrypted to cipher text C using secret key K, then exchanged between legitimate users. In Shannon's setting, cipher text C is completely known by the eavesdropper or wiretapper, and perfect secrecy is achieved only when the mutual information I of message M relative to cipher text C is zero:

$$I(M; C) = 0$$

This implies the pessimistic result that the entropy or uncertainness H of secret key K is greater than or equal to the entropy or uncertainness H of message M:

$$H(K) \geq H(M)$$

While the security in this model is provable, it would not be possible to implement it without secret keys.

A. D. Wyner, in "The wire-tap channel," *Bell System Technical Journal*, vol. 54, pp. 1355-1387, 1975, introduced the wiretap channel model as a simple, highly abstract yet effective model to illustrate information theoretical security capacity in the presence of eavesdropping. Wyner also introduced the possibility of establishing a secure channel between two legitimate users without relying on pre-sharing secret information, and further developed the definition of the perfect secrecy by per-symbol equivocation.

I. Csiszar and J. Korner, in "Broadcast channels with confidential messages," *IEEE Trans. on Information Theory*, vol. 24, pp. 339-348, 1978, characterized the secrecy capacity of the Discrete Memoryless Channel (DMC), and showed that the secrecy capacity is positive unless the wiretapper has a channel that is noisier than the channel used by the legitimate users. The secrecy capacity $C_s$ in the wiretap channel model can be expressed as a function of the main channel capacity $C_m$ and the wiretap channel capacity $C_w$:

$$C_S = \begin{cases} C_M - C_W & C_M > C_W \\ 0 & C_M < C_W \end{cases}$$

The secrecy capacity CS defines the maximum rate for the secret key exchange.

Follow up works showed that the secrecy capacity $C_s$ can be improved with a noiseless public feedback channel in the wiretap channel model. U. M. Maurer, "Secret Key Agreement by public discussion from common information," *IEEE Trans. on Information Theory*, vol. 39, pp. 733-742, 1993; R. Ahlswede and I. Csiszar, "Common randomness in information theory and cryptography, part i: Secret sharing," *IEEE Trans. on Information Theory*, vol. 39, pp. 1121-1132, 1993; U. M. Maurer and S. Wolf, "Secret key agreement over a non-authenticated channel, part i: Definitions and bounds," *IEEE Trans. on Information Theory*, vol. 49, pp. 822-831, 2003; "Secret key agreement over a non-authenticated channel, part ii: The simulatability condition," *IEEE Trans. on Information Theory*, vol. 49, pp. 832-838, 2003; and "Secret key agreement over a non-authenticated channel, part iii: Privacy amplification," *IEEE Trans. on Information Theory*, vol. 49, pp. 839-851, 2003.

Recent studies have explicitly pointed out that channel fading and user cooperative jamming could also provide channel security. M. Bloch, et al., "Wireless information-theoretic security: part i: Theoretical aspects," *IEEE Trans. on Information Theory*, 2006; and "Wireless information-theoretic security: part ii: Practical implementation," *IEEE Trans. on Information Theory*, 2006.

This research highlights the use of channel randomness, in the form of independent noise, to provide provable security. While the randomness affects both legitimate users and eavesdroppers, only the legitimate users can agree on a set of correctly received messages and use these correctly received messages to establish a shared secrecy. Because of the independence of the noise, the secrecy will be unknown to the eavesdropper, even if the eavesdropper knows the set of messages selected by the legitimate users.

FIG. 1 is a block diagram of the prior art wiretap channel model. The traditional Alice and Bob scenario, as shown in FIG. 1, can be used to describe a theoretical secrecy sharing scheme that utilizes the channel error randomness to provide security benefits. With reference to FIG. 1, Alice 101 represents a first legitimate user at a first wireless network node and Bob 102 represents a second legitimate user at a second wireless network node. Alice 101 and Bob 102 communicate over Main Channel 103. Main channel 103 is assumed to be a Binary Symmetric Channel (BSC). As further shown in FIG. 1, Eve 111 represents an eavesdropper that has established a wiretap channel 112. Wiretap channel 112 is also assumed to be a BSC. The theoretical secrecy sharing scheme includes the following steps:

1. Alice 101 and Bob 102 agree on a set of shared error detection codes and other parameters that will be used in the secrecy sharing process. The error detection codes are preferably equiprobable parity check codes.

2. Alice 101 generates a set of uniformly distributed binary sequences and encodes them with the agreed upon error detection code. The transmitted codewords are $t_1, t_2, \ldots$ 3. Bob 102 receives the transmitted codewords as $r_1, r_2, \ldots$ 4. Bob 102 keeps m error free, correctly received binary sequences $r_{k(1)}, r_{k(2)}, \ldots, r_{k(m)}$ and broadcasts the index set $\{k(1), k(2), \ldots, k(m)\}$ repeatedly until Alice 101 confirms that she has completely and correctly received it.

5. Alice 101 uses privacy amplification techniques to distill a secrecy $S_A$ from $$t_{k(1)}, t_{k(2)}, \ldots, t_{k(m)}$$

6. Bob 102 uses privacy amplification techniques distill a secrecy $S_B$ from $$r_{k(1)}, r_{k(2)}, \ldots, r_{k(m)}$$

$S_A$ and $S_B$ are equal with very high probability, as shown by Xiao, S., et al., "Dense Parity Check Based Secrecy Sharing in Wireless Communications," pp. 54-58 in Global Telecommunications Conference, 26-30 Nov. 2007, GLOBECOM '07, IEEE, Washington, D.C., 2007, and incorporated by reference herein. Further, it has been shown that the information leak to an adversarial wiretapper is lower bounded. As long as the wiretapper's channel is not error free, secrecy sharing is possible under Wyner's per-symbol equivocation definition of the perfect secrecy.

2. Existing Wireless LAN Security Architecture

Figure 2A:
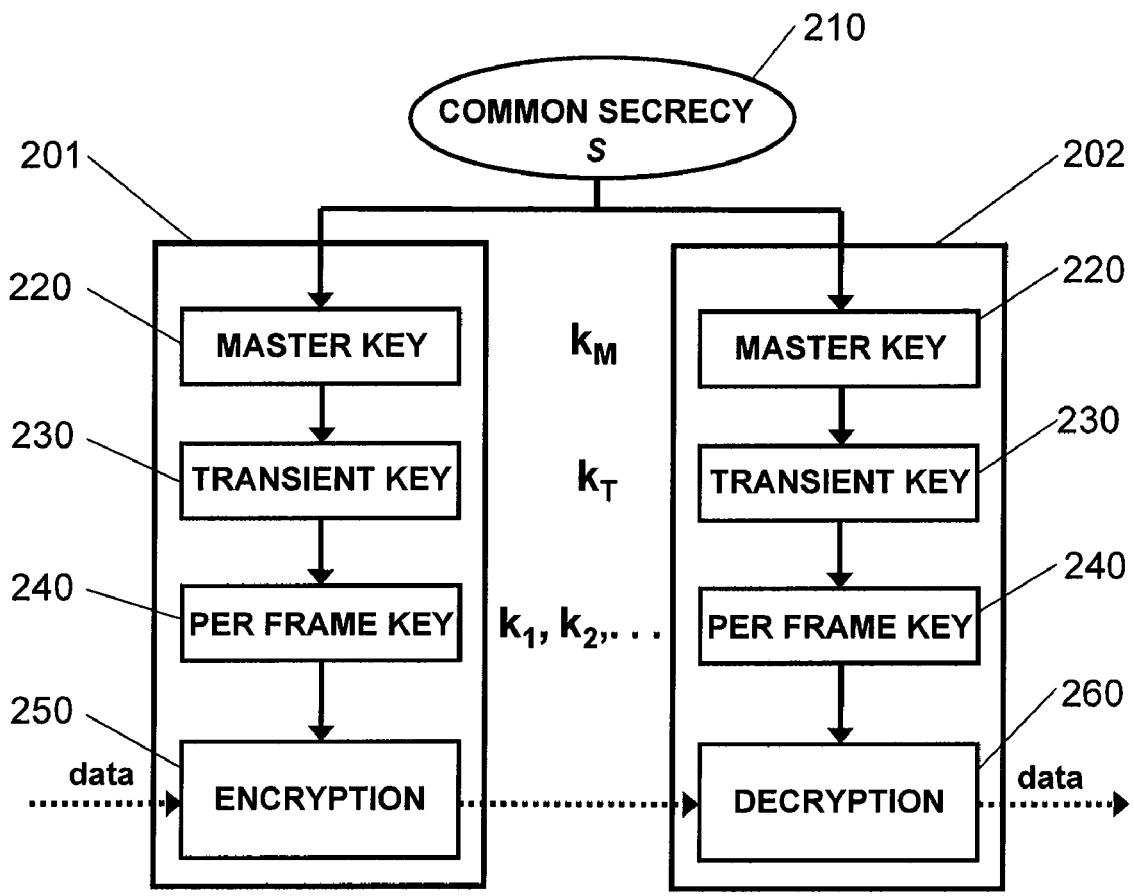
FIG. 2A is a functional flow chart of the keys used within a typical prior art wireless LAN security architecture.

FIG. 2A depicts the flow of keys within a typical prior art wireless LAN security architecture comprised of two communication peers 201 and 202, and represents many security standards used in both wired and wireless networks, including WEP and WPA. In this model, data confidentiality and authentication are bonded with the same common secrecy s 210. The common secrecy s 210 could be a static password, a mutually authenticated digital certificate pair, a dynamic token or other type of secrecy known in the art. The common secrecy s 210 is the shared basis for building trust between two communication peers 201 and 202. Producing, distributing, and managing the common secrecy s 210, though, is very expensive. In addition, a key management failure or implementation flaw could comprise the security of the entire network. While the secrecy utilization flow is somewhat protected in wired communications networks, it is very fragile in wireless networks.

With further reference to FIG. 2A, the cryptographic process starts with a master key $k_M$ 220, which is generated from the common secrecy s 210, as defined above. After a key negotiation process, a transient key $k_T$ 230 is agreed on by the communication peers 201 and 202. The agreement of transient key $k_T$ 230 also marks a successful authentication.

Transient key $k_T$ 230 contains the first per-frame key $k_1$ 240. The successive per-frame keys $k_2, k_3, \ldots$ are generated recursively by a key generation function, which is a deterministic permutation $f_{k(\cdot)}$.

$$k_{i+1} = f_k(k_i) \; i=1, 2, \ldots$$

These processes, generating the master key $k_M$ 220, the transient key $k_T$ 230, and each of the per-frame keys $k_1, k_2, k_3$, are public and deterministic. In terms of the information entropy $H(\cdot)$, the entropy of the per-frame keys $k_1, k_2, k_3$, relative to the transient key $k_T$ 230, and the entropy of the transient key $k_T$ 230 relative to the master key $k_M$ 220, are both zero:

$$H(k_1, k_2, \ldots, k_{i-1}, k_{i+1}, \ldots | k_i)=0 \; i=1, 2, \ldots$$

$$H(k_1, k_2, \ldots | k_T)=0$$

$$H(k_T | k_M)=0$$

The per-frame encryption process fe(•) 250 and the per-frame decryption process fd(•) 260 are also deterministic:

$$\begin{cases} \tilde{m}_i = f_e(m_i, k_i) \\ m_i = f_d(\tilde{m}_i, k_i) \end{cases}$$

where
$f_e(\cdot)$ is the encryption function;
$f_d(\cdot)$ is the decryption function;
$m_i$ is the $i^{th}$ clear text frame; and
$\tilde{m}_i$ is the corresponding cipher text frame to be transmitted in the air.

As a result, as shown below, the secrecy utilization chain is the single point of failure because the entropy of the per-frame keys $k_1, k_2, k_3$ relative to the common secrecy s, the master key $k_M$ 220, the transient key $k_T$ 230, or any one per-frame key $k_i$, are all zero. With zero relative entropy, if one link in the chain is known, then all successive links in the chain are also known.

$$H(k_1, k_2, \ldots | s)=H(k_1, k_2, \ldots | k_M)= H(k_1, k_2, \ldots | k_T)=H(k_1, k_2, \ldots | k_i)=0$$

Once any step in this chain is compromised, each of the eavesdropped cipher text frames $\tilde{m}_i$ could be readily deciphered. However, if the per-frame keys could be gradually uncorrelated, as shown below, the single point of failure problem would be solved for a reasonably large value of N. The value of N is determined in part by the error rate of the communication channel and the desired security level. In many practical short-distance wireless communication scenarios, where each data block is much longer than the length of the key, more than 100 frames per second are exchanged between nodes, and errors occur in bursts, the value of N may be as small as 100. As a result, if a user's secret key is automatically updated every second, an adversary would need to crack the new key every second to decipher the cipher text frames.

$$H(k_{i+N}|k_i) \approx H(k_{i+N}) \; i=1, 2, \ldots$$

A security scheme that satisfies this equation, above, meets the security requirements described above, specifically provability and testability. A leaked or cracked key would not affect many frames, because every frame is fully protected by the corresponding per-frame key, and the entropy of the per-frame key is frequently refreshed:

$$H(m_i|\tilde{m}_i, s)=H(m_i|\tilde{m}_i, k_M)=H(m_i|\tilde{m}_i, k_T)=H(m_i|\tilde{m}_i, k_1) \approx H(k_i) \; i>N$$

Further, applying the reversal algorithm, even with infinite computing power, would not destroy the security scheme:

$$H(m_{i+N}|\tilde{m}_{i+N}, k_i) \approx H(k_{i+N}) \; i=1, 2, \ldots$$

An adversary would have to crack the key for at least every N frames, which is theoretically an impossible task given modern cryptographic algorithms.

The common secrecy can be considered to be the adversary's uncertainty, which is also a measure of randomness in information theory. The present invention accumulates the randomness to increase the adversary's uncertainty. This accumulation can be used to create a wireless communications system that is more secure than a typical wired communications system, because a wireless system has more randomness than a wired system, due to factors such as transmission errors, user mobility, and connectivity dynamics.

3. Secrecy Sharing Generation Protocols

The invention described herein implements the theoretical scheme described above within a wireless network. In preferred embodiments, the invention provides two primary protocols for generating shared secrecy between wireless nodes, both of which utilize the inherent randomness in the wireless communications channel to provide provable and testable security.

The first protocol, the Dense Parity Check-Based Secrecy Sharing Protocol, uses detectable but non-correctable codes. In the channel coding area, practitioners are dedicated to making the best use of redundancy to recover from transmission errors. Contrary to this common practice, however, the present invention takes advantage of the inevitable transmission errors by making the channel coding effective only for detecting errors, not for correcting or recovering from them. Legitimate users can use the reliably-received information to build the common secrecy agreement between them. As long as the eavesdropper cannot receive the same identical information as that received by the legitimate users, the eavesdropper is guaranteed to experience information loss, regardless of its available computing power or algorithmic advantage. Note also that in the channel coding area of research, the use of dense parity check is not favored, unlike the well-known and often-used low density parity check (LPDC). With dense parity check, the error propagation prevents the use of iterative decoding, and the maximum likelihood of decoding is an NP-complete problem.

The second protocol, the Automatic Error Tracing (AET) Secrecy Sharing Protocol, does not use the dense parity check codes of the first protocol, nor does it require the dedicated feedback of the Dense Parity Check-Based Secrecy Sharing Protocol. Instead, the AET Secrecy Sharing Protocol modifies the inherent error control feedback mechanism of the underlying wireless communication system. Further, while both protocols utilize the wireless transmission errors to provide the shared secrecy, the AET Secrecy Sharing Protocol uses additional possible sources of randomness, such as source randomness and mobility.

Figure 2B:
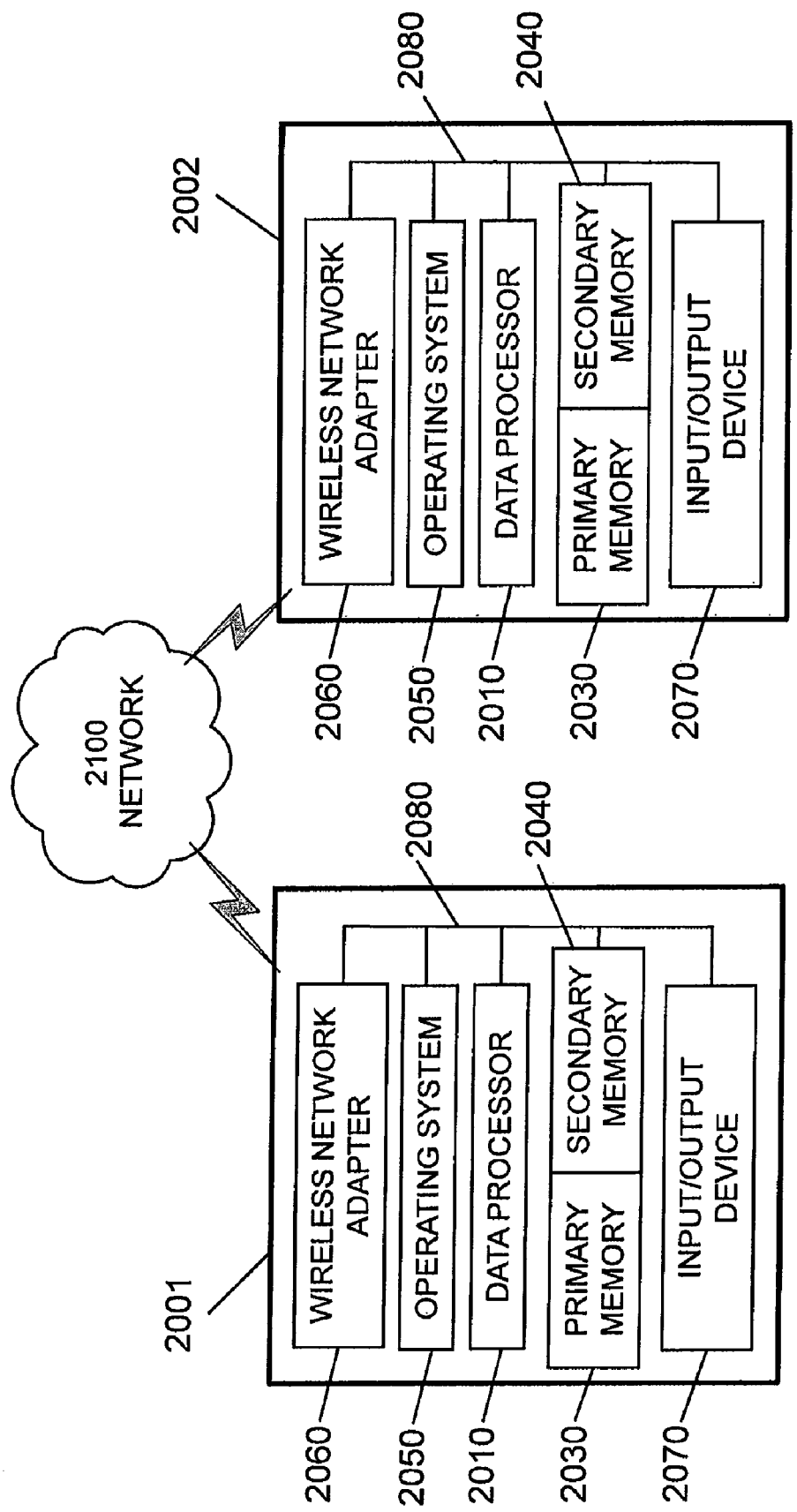
FIG. 2B is a simplified block diagram of a prior art wireless network with two network nodes.

A simplified block diagram of a prior art wireless network 2100 with two physical network computer nodes is generally shown in FIG. 2B. First network node 2001 and second network node 2002 may each include, but are not limited to, well know components such as data processor 2010; primary memory or storage 2030; secondary memory or storage 2040; and input/output (I/O) devices and corresponding drivers 2070. Communications between the components within each of the network nodes is provided by communications path 2080. Note that the present invention is not limited to only two network nodes.

In one embodiment, processor 2010 is a conventional, integrated circuit microprocessor arrangement, such as one or more PENTIUM® 4 processors, as supplied by INTEL Corporation of Santa Clara, Calif., USA. Primary memory or storage 2030 and secondary memory or storage 2040 provide the data storage required by the network nodes for program and other data and may include one or more types of solid-state electronic memory, magnetic memory, or optical memory. By way of non-limiting example, primary memory or storage 2030 and/or secondary memory or storage 2040 may include solid-state electronic Random Access Memory (RAM), Programmable Read-Only Memory (PROM), Electrically Programmable Read-Only Memory (EPROM), or Electrically Erasable Programmable Read-Only Memory (EEPROM), optical disk memory such as a CD-ROM or DVD; magnetically encoded hard disk, floppy disk, or any combination of these types, and may be volatile and/or non-volatile memory. I/O devices 2070 may include, but are not limited to, a keyboard, mouse, track ball, printers, and monitors. First network node 2001 and second network node 2002 both run an operating system 2050, such as one of the commercial off-the-shelf Linux operating systems, Microsoft Windows operating systems, and MAC OS operating systems. Other operating systems may be used without undue experimentation by those skilled in the art.

With further reference to FIG. 2B, first network node 2001 and second network node 2002 each include a wireless network adapter 2060 (also known as a wireless NIC or a wireless network card) for connection to the wireless network 2100. The wireless network adapter 2060 may be built into the network node, or may be added on. In one embodiment, the network adapter card is the Linksys WUSB54AG, as supplied by Linksys, a division of Cisco, of Irvine, Calif., USA, and Dell 1450 USB, supplied by Dell, of Round Rock, Tex., USA. The Linksys WUSB54AG is compatible with the USB hardware interface standard of most computers.

3.1. Dense Parity Check-Based Secrecy Sharing Protocol

Figure 3:
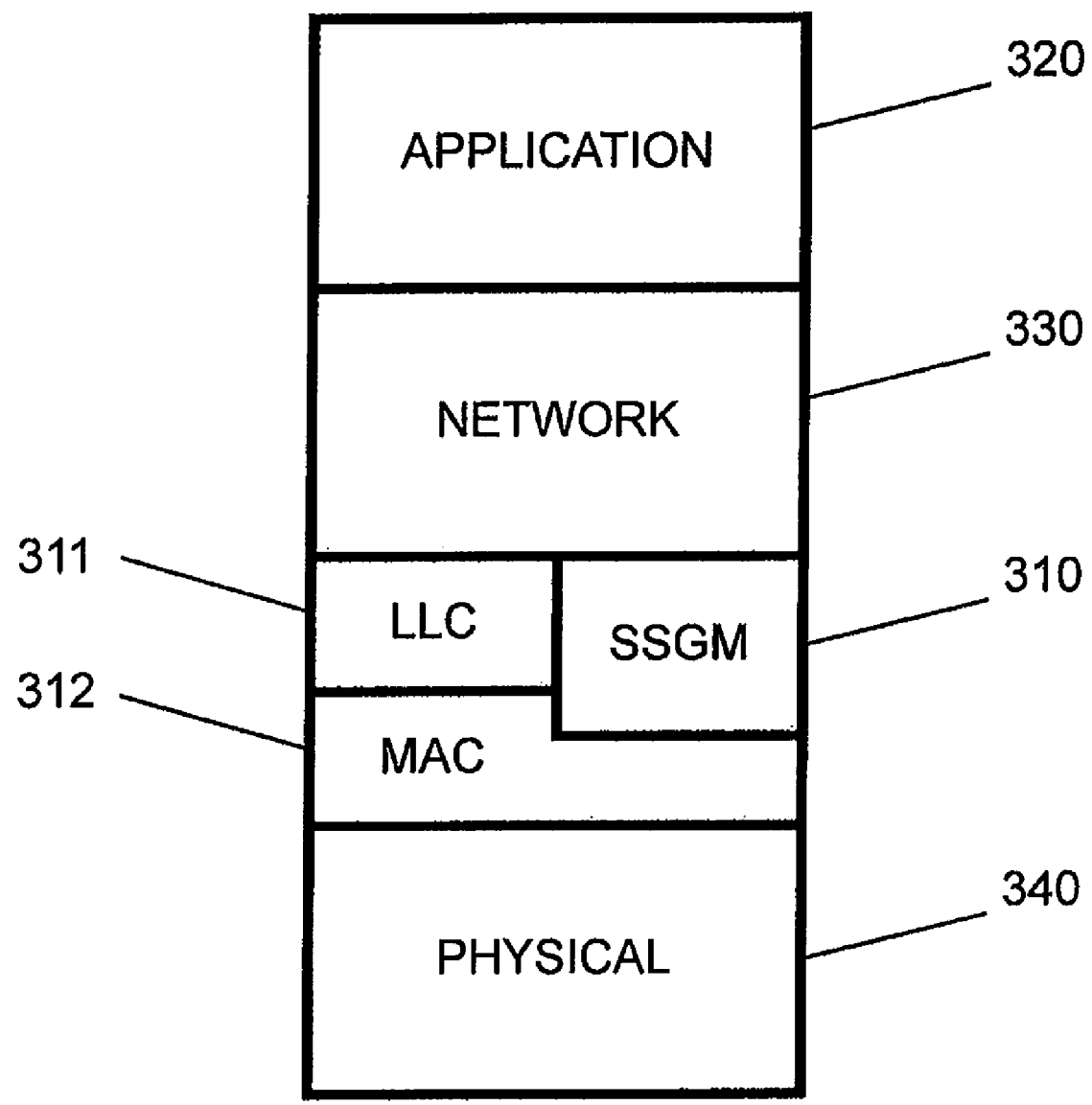
FIG. 3 is a block diagram of the networking structure of a wireless network node, showing the addition of the Dense Parity Check-Based Secrecy Sharing Protocol generation module (SSGM) of the present invention.

FIG. 3 is a block diagram of the networking structure of a wireless network node, showing the addition of a Shared Secrecy Protocol Generation Module 310 (SSGM) of the present invention. As shown in FIG. 3, the Shared Secrecy Protocol Generation Module 310 (SSGM) is a digital logic module that can be added to existing wireless nodes to implement the shared secrecy generation protocol. With further reference to FIG. 3, SSGM 310 modifies the functionality of the Logical Link Control (LLC) 311 and Media Access Control (MAC) 312 sublayers. FIG. 3 also shows the application layer 320, the network layer 330, and the physical layer 340. In a preferred embodiment, the SSGM 310 is implemented as a firmware modification, by replacing the instructions which calculate and verify the cyclic redundancy check (CRC) checksum with instructions to calculate and verify the dense parity check codes for each frame.

Figure 4:
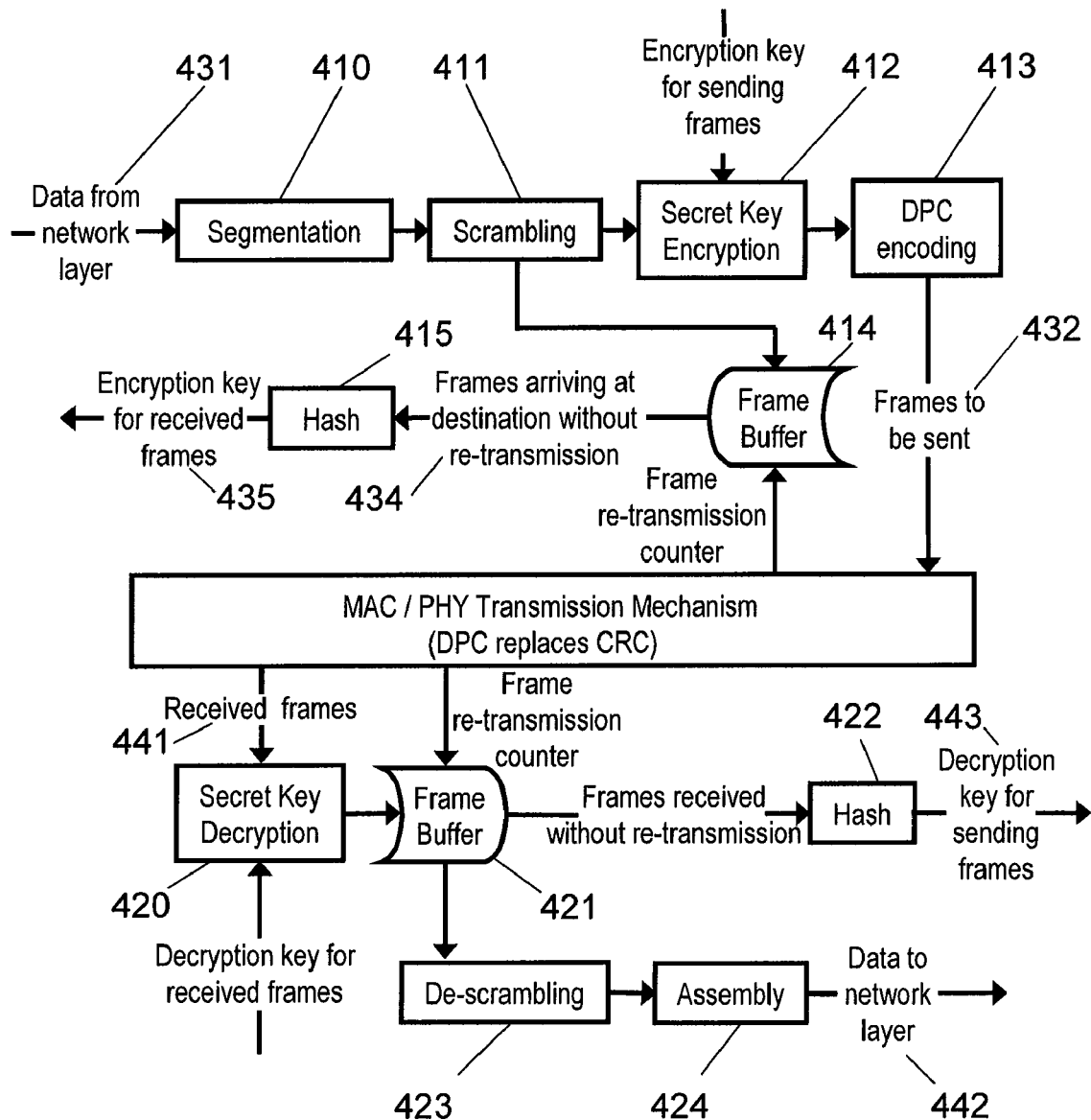
FIG. 4 is a flow chart of the Dense Parity Check-Based Secrecy Sharing Protocol of the present invention.

FIG. 4 is a functional flow chart of the Dense Parity Check-Based Secrecy Sharing Protocol of the present invention. As shown in FIG. 4, the protocol enables legitimate users to agree on correctly received messages and compress these messages to dynamically create shared symmetric secret keys. FIG. 4 illustrates both the sending and receiving processes for an individual wireless network node.

3.1.1 Sending Process

With further reference to FIG. 4, when a wireless network node initiates a communication to another node, data 431 received from the network layer first undergoes Segmentation at stage 410. Using techniques well known in the art, the Segmentation stage 410 converts network packets into data link frames for use by the LLC and MAC layers. The second stage in the sending process is the Scrambling stage 411, which enhances the transmission efficiency of the frame and breaks content semantic correlations. In a preferred embodiment, entropy encoding is used to scramble the incoming data from the network layer. Entropy encoding is well known in the art as a lossless data compression scheme. In alternate embodiments, other well-known data compression schemes could be used, including but not limited to Huffman coding, arithmetic coding, Golomb coding, and their adaptive forms such as adaptive Huffman coding, content adaptive binary arithmetic coding, and exponential Golomb coding. The output of the Scrambling stage 411 is a random bit stream where each bit is sufficiently independent of every other bit.

With further reference to FIG. 4, the Encryption stage 412 may use any modern secret key encryption method. In a preferred embodiment, the Advanced Encryption Standard (AES-Rijndael) cipher is used to encrypt the scrambled bit stream. In alternate embodiments, other well-known encryption methods could be used, including but not limited to the Blowfish cipher, the Serpent cipher, and the Twofish cipher.

The next stage is the Dense Parity Check (DPC) Encoding stage 413. DPC Encoding is known in the art, and equiprobable parity check codes that are detectable, but not correctable, are used in the preferred embodiment. The invention requires that, as a first step, all of the wireless network nodes agree on the set of equiprobable parity check codes to be used in the secrecy sharing protocol.

The use of detectable but non-correctable codes is a key feature of the invention. In a typical wireless operation, such as the WiFi unlicensed bands, both the 2.4 GHz and the 5.8 GHz carrier wavelengths (0.125 m and 0.052 m, respectively) are very small compared to the natural environmental variations. Therefore, most of the errors in communication are independent in different physical locations. The currently deployed forward error detection codes help to recover information from the received erroneous data, which benefits both the legitimate users and the eavesdropper. By detecting, but not correcting, these transmission errors using the DPC codes, the legitimate users can eliminate these random errors through feedback and negotiation, while the eavesdropper cannot. The legitimate users can select only those messages that are correctly received to use in generating the shared secrecy. The use of DPC codes is further described in Xiao, S., et al., "Dense Parity Check Based Secrecy Sharing in Wireless Communications," pp. 54-58 in Global Telecommunications Conference, 26-30 Nov. 2007, GLOBECOM '07, IEEE, Washington, D.C., 2007, and incorporated by reference herein.

Note that dense parity code checks had long been considered to be useless in the field of modern communication schemes because the decoding complexity increases exponentially with the code length, and un-decodable codes provide no benefits. For approximately half a century, researchers have long been in favor of the LDPC (low density parity check codes), and ignored the dense parity check codes. Further, equiprobable binary codes are the most dense parity check code, and were chosen for the present invention because they are the most difficult to decode. In effect then, the present invention takes a property considered in the art to be negative, and uses it beneficially for secure communications.

With further reference to FIG. 4, the DPC Encoding stage 413 outputs the frames 432 to be sent to the receiving wireless node. In the traditional selective repeat protocol, a transmitted frame is temporarily stored in memory in the Frame Buffer 414 until a corresponding acknowledgement (ACK) is received, after which the transmitted frame is sent to a disposal process and the system reclaims the memory. If a timeout occurs before the ACK is received, the frame is retransmitted. The present invention modifies the traditional selective repeat protocol by sending those frames whose ACKs arrive before any re-transmission to a seed pool. The seed pool is then used to create the secret key.

With further reference to FIG. 4, a subset of the correctly received frames 434 are used as input to the Hash stage 415 to create the seed pool, and ultimately to create the encryption key for the received frames 435. In a preferred embodiment, the Hash stage 415 employs the following universal hashing algorithm:

$$K=((aS+b) \bmod p) \bmod (2^n+1)$$

where: K is the output secret key, S is the seed formed by combining frames in the seed pool, a and b are randomly chosen parameters, p is a prime number, where $p \geq \max S$, and n is the number of bits in the secret key.

The general purpose of the Hash stage 415 is to propagate the information loss as quickly as possible. In alternate embodiments, the hashing algorithm could be any algorithm that satisfies the following criteria:

$$\begin{cases} H(K_{t+1} \mid E) > H(K_t \mid E) & H(S_{t+1} \mid E) > 0 \\ H(K_{t+1} \mid E) = H(K_t \mid E) & H(S_{t+1} \mid E) = 0 \end{cases}$$

Where H represents entropy, E is the knowledge of the adversary, S represents the seed frames, and K is the secret key. As shown by U. M. Maurer, "Secret Key Agreement by public discussion from common information," IEEE Trans. on Information Theory, vol. 39, pp. 733-742, 1993, the information loss should be strictly accumulated by the key generator.

In a preferred embodiment, two rounds of processing are used to generate the secret key 435. In the first round, the seed frames are mapped to a bit string of the same length as the secret key using the universal hashing algorithm described above. In the second round, the generated bit string from the first round is exclusive or'd (XOR) with the old secret key to create the new secret key. The formal expression is as follows:

$$\begin{cases} S_{t+1} = \sum_{i=1}^{m} S_{t+1}^{(i)} * 2^{\sum_{j=i}^{m} t_j} \\ T_{t+1} = ((aS_{t+1} + b) \bmod p) \bmod (2^n + 1) \\ K_{t+1} = T_{t+1} \oplus K_t \\ t = 1, 2, \ldots \end{cases}$$

Where $S_t$ is the $t^{th}$ seed formed by seed frames $\{S_t(i), i=1, 2, \ldots, m\}$, $\{1j, j=1, 2, \ldots, m\}$ are the lengths of the seed frames, and n is the secret key length in bits.

3.1.2 Receiving Process

With further reference to FIG. 4, when a wireless node receives a communication from another node, the bits received from the physical layer are arranged into frames 441 and decrypted at the Decryption stage 420. The Decryption stage 420 may use any modern secret key decryption method that corresponds to the secret key encryption method used in Encryption stage 412 in the sending process. The decrypted frames are temporarily stored in memory in the Frame Buffer 421 until a new frame arrives without re-transmission of the buffered frame, which confirms that the sender correctly received the corresponding ACK before re-transmitting the frame. As with the sending process, described above, those frames whose ACKs arrive before any re-transmission are send to a seed pool. The seed pool is used to create the secret key in the Hash stage 422. The Hash stage 422 employs the same universal hashing algorithm as used in the Hash stage 415 in the sending process, as described above. As with the sending process, the Hash stage ultimately creates the decryption key for sending frames 443. As described above, the secret keys generated by the sender and the receiver are equal with a very high probability.

With further reference to FIG. 4, all frames, after being decrypted, undergo De-scrambling at stage 423 and Assembly at stage 424, essentially reversing the process performed in the Scrambling stage 411 and Segmentation stage 410 of the sending process. Both the De-scrambling stage 423 and the Assembly stage 424 use techniques well known in the art to create the data packets 442 that are sent to the network layer.

3.1.3 Implementation and Test

The Dense Parity Check-Based Secrecy Sharing protocol of the present invention was implemented with commercial off-the-shelf personal computers, specifically Dell Inspiron 1300 laptops with Dell 1450 Universal Serial Bus (USB) wireless adaptors. It should be noted that the invention may be implemented on a wide range of telecommunications systems, and is not limited to personal computers. Personal computers were chosen as the experimental platform because of the relative ease of set-up and to demonstrate that the algorithms of the present invention can be utilized cost-effectively using publicly-accessible technology.

Figure 5:
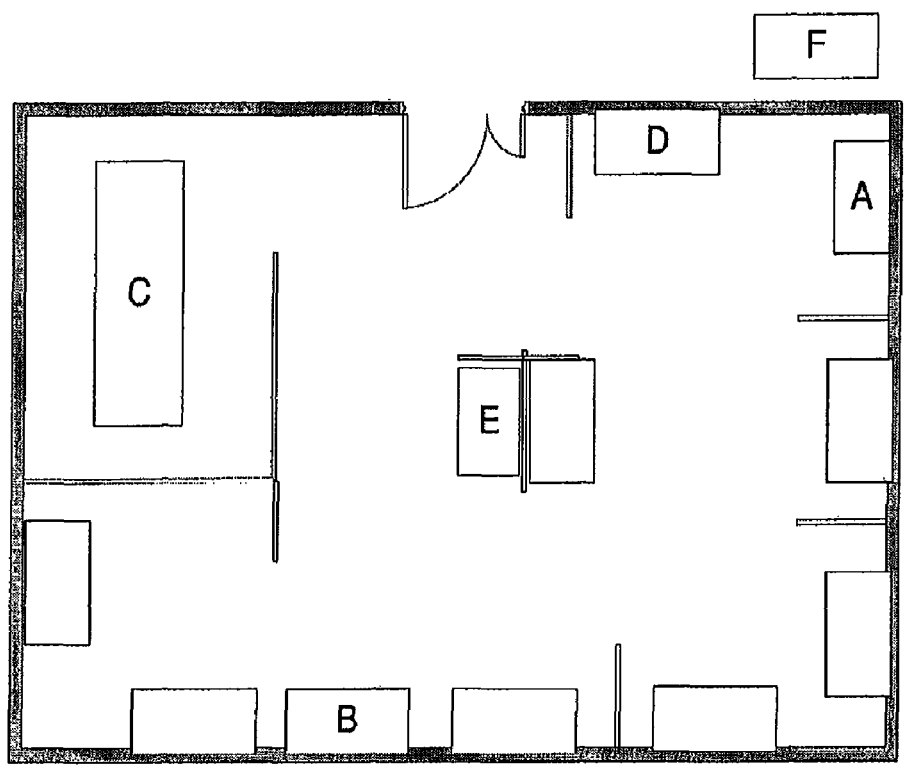
FIG. 5 is a simplified diagram of the environment used to test the Dense Parity Check-Based Secrecy Sharing Protocol of the present invention.

The test environment, a typical indoor room, is shown in FIG. 5. The physical test points are shown as A, B, C, D, E, and F. The sender was located at test point A, and the receiver was located at test point B. Test points C, D, E and F indicate the location of eavesdroppers.

Frame loss and SNR were monitored at the different test points, in effect testing the spatial independence and randomness of the transmission errors. Note that frame losses are not correlated with high confidence. When two receivers are placed apart by more than half of a carrier wave length, their noise should be considered independent, according to both electromagnetic wave propagation theory and the multiple-input and multiple-output (MIMO) experiment conducted by M. Denis, et al, "Spatial correlation in indoor wireless channels," Proc. Wireless Communications Networking Conference, March 2004, Atlanta, Ga.

IEEE 802.11b was used to emulate the worst-case scenario because of its maximum coverage radius, which in turn makes the network more vulnerable to eavesdropping. At other test points, which could be additional physical locations for an eavesdropper, the adapter was extended with a 14.5 dBi gain directional antenna. The sender A's transmission power was restricted to half of the maximum value. The measured SNR and frame loss at each of the test points are shown in Table 1:

TABLE 1

| | Test Points | | | | |
|---|---|---|---|---|---|
| | B | C | D | E | F |
| SNR (dB) | 38 | 46 | 55 | 40 | 32 |
| Frame Loss Rate | 0.14 | 0.11 | 0.08 | 0.15 | 0.12 |

With reference to Table 1, the numbers shown are averaged from one million test frames for each of the test points. The variation is high, because even human movement can cause the SNR to change by over 10 dB. Consequentially, the measured results have only one or two significant digits.

The measured data show that, even if C, D, E and F are all eavesdroppers, and even if C, D, E and F combine their data to get the diversity gain, after 104 frames the probability of successfully receiving all the frames is only 0.2. Clearly, such a low probability would frustrate anyone attempting to eavesdrop on the communications with the intent of breaking the upper layer encryption. After 105 frames, the probability of determining the MAC layer secret key is extremely small ($P \approx 1.3 \times 10^{-7}$). To comfortably defend itself against four cooperative near-range eavesdroppers with strong receivers then, legitimate users would only need to transfer 5.1M bytes of data, assuming each frame contains 512 bits. In a normally congested network, transferring this amount of data would take approximately fifteen seconds or less.

The efficiency of the inventive protocol was also tested. Note that the frame size does not have a significant effect on the frame error rate, because the frame correlation time is very short. For an n bits frame, the correlation time can be expressed as:

$$T_{corr} = \frac{n}{R}$$

Where R is the transmission rate in bits per second.

Figure 6:
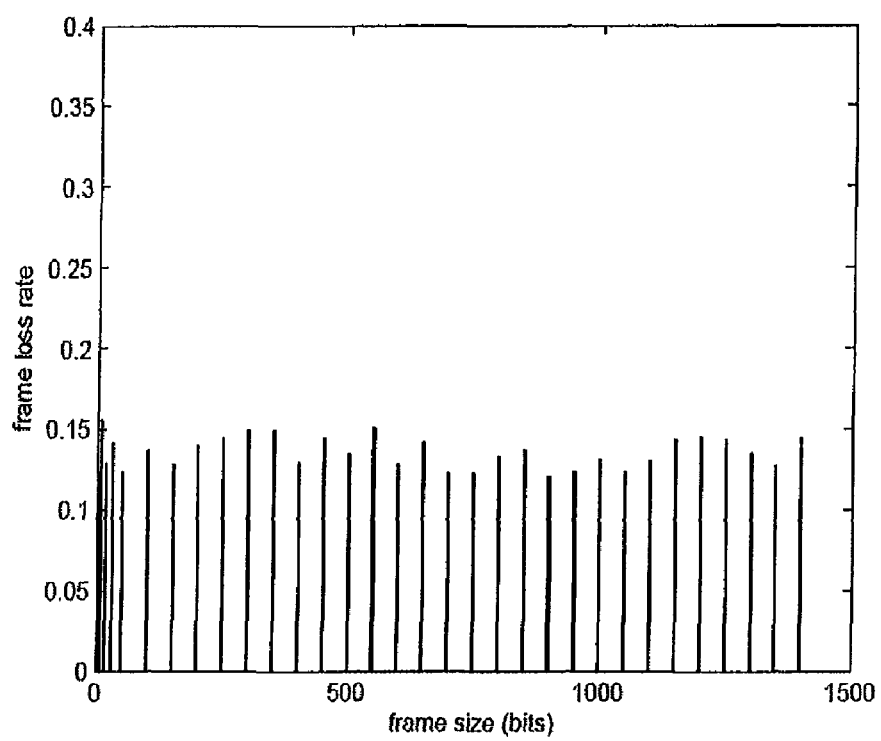
FIG. 6 is a plot of the frame loss rate vs. frame size for a typical two node communication channel.

For a 64 bit frame, in an 11 Mbps link, the frame correlation time is only 5.8 μs. Even a bulky 1400 bytes frame would only increase the correlation time to 1 ms, which is still very short compared to the natural environmental variations. FIG. 6 is a plot of the frame loss rate vs. frame size for a typical two node communication channel A→B. Note that because frame loss is not sensitive to frame size, the inventive protocol is compatible with many existing MAC fragmentation conventions.

3.2. Automatic Error Tracing (AET) Secrecy Sharing Protocol

In preferred embodiments, the Automatic Error Tracing (AET) Secrecy Sharing Protocol of the present invention includes three algorithms: (1) a sender-side algorithm used to generate a randomness set for the sender; (2) a receiver-side algorithm used to generate a randomness set for the receiver; and (3) an algorithm that uses the randomness set generated by the receiver or the sender to protect the key generation process and thus maximize an adversary's uncertainty.

In a preferred embodiment, the first two algorithms, adapted from the prior art Stop-and-Wait Automatic Repeat reQuest (SW-ARQ) error control method, form identical randomness sets for both the sender and receiver. The third algorithm is implemented identically at both the sender and receiver, and applies a string extracted from the randomness set to create a key mask used in the key iteration process. Note that these three algorithms may be implemented with any Automatic Repeat reQuest (ARQ) system, and the invention is not limited to the SW-ARQ method described below.

3.2.1 Modified Sender SW-ARQ Algorithm

Figure 7:
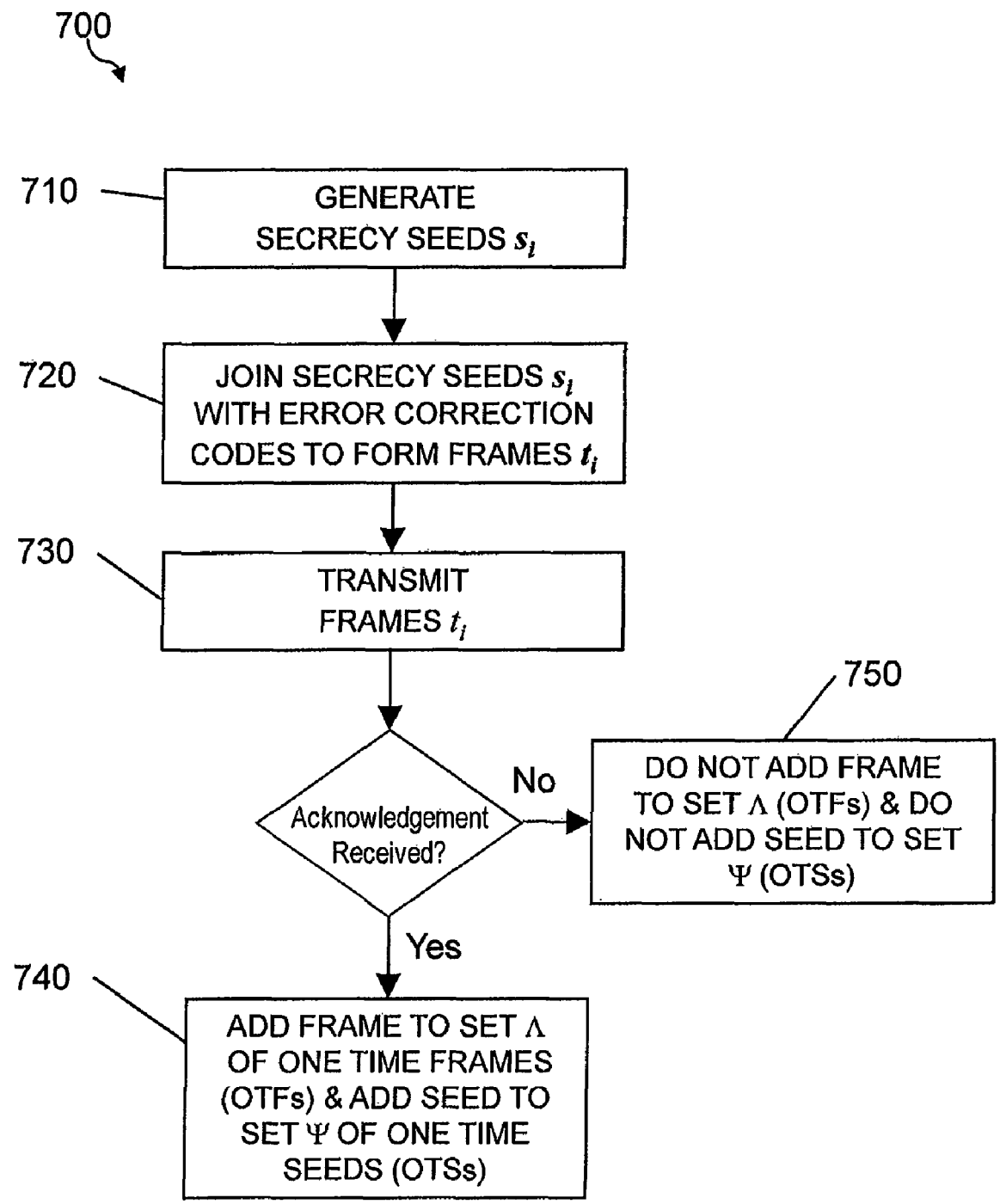
FIG. 7 is a flow chart of a method used by the sender node to create a randomness set in the Automatic Error Tracing (AET) Secrecy Sharing Protocol of the present invention.

FIG. 7 is a functional flow chart of the method 700 of the Modified Sender SW-ARQ Algorithm used by the sender to create a randomness set in a preferred embodiment of the invention. As shown in FIG. 7, in step 710 a set of uniform random strings or secrecy seeds $s_i$ are generated:

$$\{s_i | i=1, 2 \ldots\}$$

In step 720, the secrecy seeds $s_i$ are joined with error correction codes to form a series of frames $t_i$, $\{t_i | i=1, 2, \ldots\}$. The error detection codes are assumed to be sufficiently strong such that the probability of an undetected error for any frame is negligibly small.

In step 730, the sender transmits a frame $t_i$. In step 740, if the acknowledgement (ACK) is received from the receiver after only one transmission attempt, as determined by the re-transmission counter $C^r$, the frame is added to the set of One Time Frames (OTFs) Λ and the corresponding seed is added to the set of One Time Seeds (OTSs) Ψ. Conversely, if the ACK is not received, and the frame is re-transmitted, the frame and the corresponding seed are not added to the sets of One Time Frames (OTFs) Λ or One Time Seeds (OTSs) Ψ, as shown in step 750. The set of One Time Frames (OTFs) Λ and the set of One Time Seeds (OTSs) Ψ comprise the randomness set for the sender:

Λ={i|frames i is correctly received without re-transmission}

Ψ={$s_i$|i ∈Λ}

The sender-side algorithm is defined as follows:

```
Input: sending frames {t_i, i = 1, 2, ...}, s_i ⊂ t_i
       corresponding acknowledgement ACK_i on t_i
Output: Λ, Ψ
1 foreach t_i do
2 |   C^t = 0;
3 |   repeat
4 |   |   C^t = C^t+1;
5 |   |   send t_i, C^t;
6 |   |   wait until ACK timeout;
7 |   until ACK_i received;
8 |   if C^t = 1 then
9 |   |   Λ = Λ ∪ {i}, Ψ = Ψ ∪ {s_i};
```

3.2.2 Modified Receiver SW-ARQ Algorithm

Figure 8:
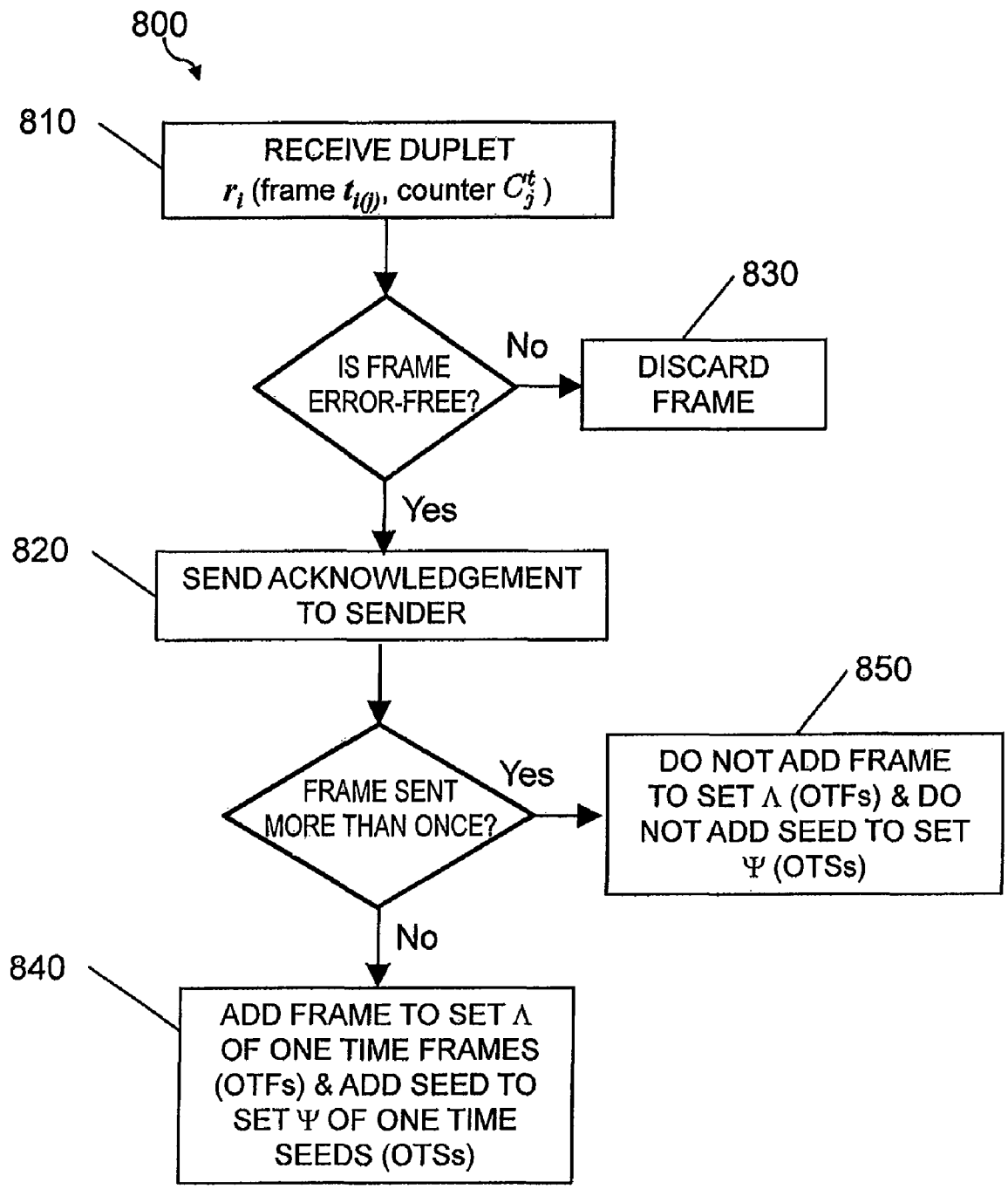
FIG. 8 is a flow chart of a method used by the receiver node to create a randomness set in the Automatic Error Tracing (AET) Secrecy Sharing Protocol of the present invention.

FIG. 8 is a functional flow chart of the method 800 of the Modified Receiver SW-ARQ algorithm used by the receiver to create a randomness set in a preferred embodiment of the invention. Note that the Modified Sender SW-ARQ algorithm and the Modified Receiver SW-ARQ algorithm create identical randomness sets. While the sender-side algorithm is relatively intuitive, because the sender explicitly knows which frames are sent only once, the receiver-side algorithm uses the immediate next received (frame, re-transmission counter) duplet to determine whether the sender had sent the previous frame more than once.

As shown in FIG. 8, in step 810 the receiver receives a duplet $r_j$, comprising a frame $t_{i(j)}$ and a re-transmission counter $C_j^t$. In step 820, if the received frame $t_{i(j)}$ is error-free, the receiver sends an acknowledgement (ACK) to the sender. Conversely, if the received frame $t_{i(j)}$ is not error-free, the frame is discarded, as per step 830. In step 840, if the re-transmission counter indicates that the sender has not sent the previous frame more than once, the frame is added to the set of One Time Frames (OTFs) Λ and the corresponding seed is added to the set of One Time Seeds (OTSs) Ψ. Conversely, if the frame was sent multiple times by the sender, the frame and the corresponding seed are not added to the sets of One Time Frames (OTFs) Λ or One Time Seeds (OTSs) Ψ, as per step 850. The set of One Time Frames (OTFs) Λ and the set of One Time Seeds (OTSs) Ψ for the receiver comprise the same randomness set generated by the sender.

The receiver-side algorithm is defined as follows:

```
Input: received duplet sequence {r_j = (t_i(j), C_j^t) | j = 1, 2, ...}, s_i(j) ⊂ t_i(j)
Output: Λ, Ψ
1 foreach r_j = (t_i(j), C_j^t) do
2 |   if t_i(j) has no error then
3 |   |   Send ACK_i(j);
4 |   |   wait until r_{j+1} = (t_i(j+1), C_{j+1}^t) arrives;
5 |   |   if C_j^t = 1 and i(j+1) ≠ i(j) then
6 |   |   |   Λ = Λ ∪ {i(j)}, Ψ = Ψ ∪ {s_i(j)};
```

Figure 9:
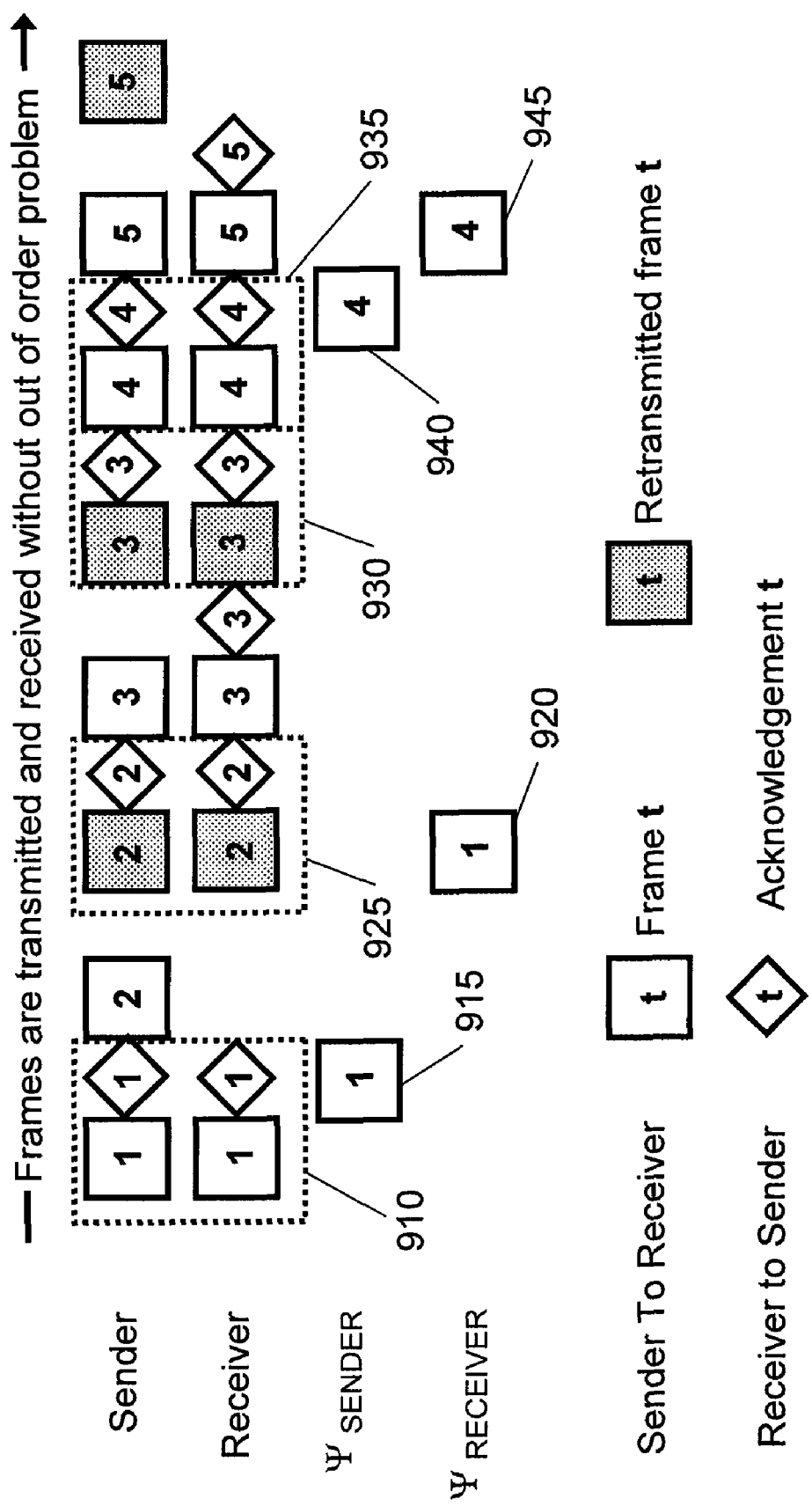
FIG. 9 is an example of the flow of frames and acknowledgements between nodes in the Automatic Error Tracing (AET) Secrecy Sharing Protocol of the present invention.

FIG. 9 illustrates the sender-side and receiver-side algorithms. As shown in FIG. 9 at 910, on the sender side, frame 1 is sent and acknowledged, and is not re-transmitted. The sender therefore adds frame 1 to the set of One Time Frames Λ at 915. Subsequently, when the receiver receives frame 2 and determines that frame 1 has been transmitted only once, the receiver adds frame 1 to the set of One Time Frames Λ at 920.

As further shown in FIG. 9 at 925, when the sender does not receive an acknowledgement for frame 2, the sender resends frame 2. As a result of this re-transmission, neither the sender nor the receiver add frame 2 to the set of One Time Frames Λ With further reference to FIG. 9 at 930, frame 3 is similarly re-transmitted, and not included in the set of One Time Frames Λ. As shown in FIG. 9 at 935, frame 4, however, is transmitted only once, and is added to the set of One Time Frames Λ by the sender at 940 and by the receiver at 945. As shown in FIG. 9, after all the frames have been transmitted, both the sender and the receiver have the identical set of One Time Frames Λ, and the identical set of corresponding One Time Seeds Ψ.

In this scenario, because each frame is transmitted in one hop and the ACK timeout period is longer than the maximum round trip delay, there is no frame out of order problem. As a result, the acknowledgement with the frame index or counter is sufficient to ensure that the two algorithms generate consistent outputs at the sender and the receiver. Note that the sender and receiver algorithms may be adapted if the network architecture presents a frame out of order problem. For example, the receiver could implement a buffer to store and re-sequence the frame to recover the sequence order. The set of One Time Frames Λ is synchronized only for the order-ensured frames.

3.2.3 Automatic Error Tracing (AET) Algorithm

In a preferred embodiment, the third algorithm of the AET Secrecy Sharing Protocol of the present invention uses the randomness set to extract a string that has maximum equivocation to an adversary and uses the string to protect the per-frame key generation process. This algorithm is identically implemented on both the sender and receiver sides.

Before the secure communication starts, the two legitimate nodes publicly agree on the length $l_s$ of each secrecy seed $s_i$, the initial pseudo random number generation seed, and $n_{ts}$ the size threshold of the set of One Time Seeds Ψ. We define a number n by the equation:

$$n_{ts} l_s = 2^n$$

The algorithm involves $GF(2^n)$ arithmetic, where the particular irreducible polynomial for the $GF(2^n)$ application can either be defined as a standard or publicly agreed by legitimate users for each secure communication. This algorithm assumes that the cryptographically secure pseudo random number generator (CSPRNG) is available to both the sender node and receiver node. The CSPRNG in each node outputs the same pseudo random number sequence if given the same initial or starting seed. If fPRNG(•) is the interface to a CSPRNG used in this algorithm, then each call of fPRNG(•) would generate an $l_s$ length pseudo random binary string in accordance with the uniform distribution. Note that the security of the algorithm is not compromised even if an adversary knows the CSPRNG and the random number used in each round of the algorithm.

This Automatic Error Tracing Algorithm uses the following functions:

$$\begin{cases} f_{LB}(x, r) = \text{left most } r \text{ bits of } x \\ f_{PA}(x, a, r) = f_{LB}(ax, r) \end{cases}$$

$$a \in GF(2^n), x \in GF(2^n), r \in \mathcal{Z}^+$$

Where:

$fLB(x, r)$ is a function that returns the leftmost r bits of x;

ax is a multiplication on $GF(2^n)$ by any pre-agreed irreducible reducing polynomial of degree n and Z+ is the set of positive integers; and $fPA(x, a, r)$ is the privacy amplification function.

Figure 10A:
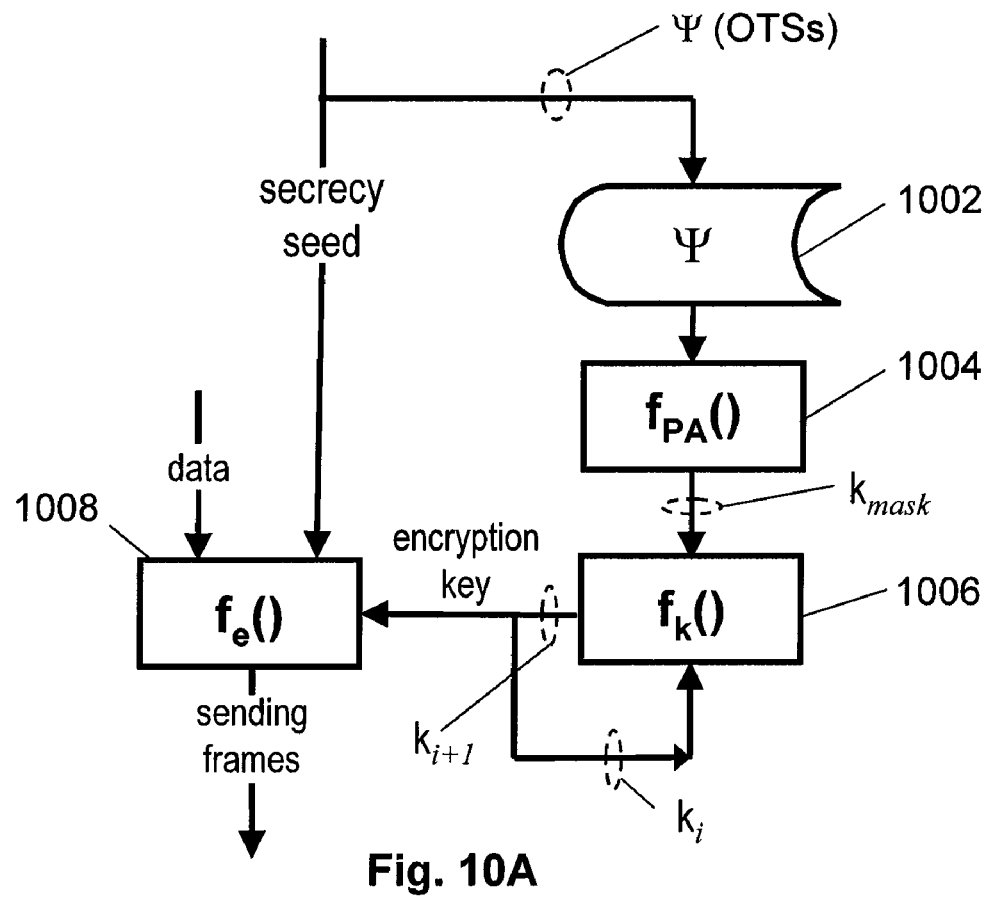
FIG. 10A is a flow chart of the sender-side of the Automatic Error Tracing (AET) Secrecy Sharing Protocol of the present invention.

As shown in FIG. 10A, on the server side at 1002, when the number of seeds in the set of One Time Seeds $\Psi$ exceeds the threshold $n_{ts}$, the seeds $s_i$ are concatenated to form a binary number $\psi$. At 1004, the privacy amplification function $fPA(x, a, r)$ generates a key mask $k_{mask}$ using the previously-generated binary number $\psi$, a random number a, and $l_k$, the bit length of the per-frame key. At 1006, a per-frame key $k_{i+1}$ is created using the per-frame key iteration function $f_k(\cdot)$ and the prior-generated frame key $k_i$. The per-frame key $k_{i+1}$ is used by the encryption function $f_e(\cdot)$ at 1008 to encrypt the frames that are sent to the receiver.

Figure 10B:
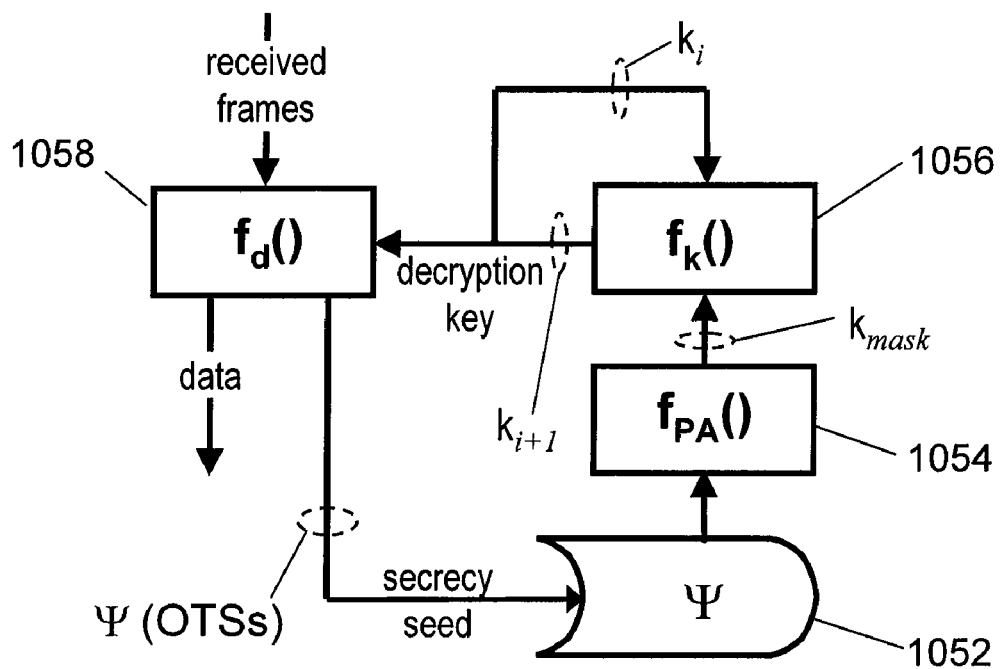
FIG. 10B is a flow chart of the receiver-side of the Automatic Error Tracing (AET) Secrecy Sharing Protocol of the present invention.

As shown in FIG. 10B, on the receiver side at 1052, when the number of seeds in the set of One Time Seeds $\Psi$ exceeds the threshold $n_{ts}$, the seeds $s_i$ are concatenated to form a binary number $\psi$. At 1054, the privacy amplification function $fPA(x, a, r)$ generates a key mask $k_{mask}$ using the previously-generated binary number $\psi$, a random number a, and $l_k$, the bit length of the per-frame key. At 1056, a per-frame key $k_{i+1}$ is created using the per-frame key iteration function $f_k(\cdot)$ and the prior-generated frame key $k_i$. The per-frame key $k_{i+1}$ is used by the decryption function $f_d(\cdot)$ at 1058 to decrypt the frames that are received from the sender.

The Automatic Error Tracing Algorithm is defined as follows:

```
Input: Λ, Ψ, k_i
Output: Λ, Ψ, k_{i+1}
1 if |Ψ| ≥ n_ts then
2    a = f_PRNG( );
3    k_mask = f_PA (Ψ, a, l_k);
4    k_{i+1} = f_k(k_mask ⊕ k_i);
5    Ψ → empty set;
6    Λ → empty set;
```

Figure 11:
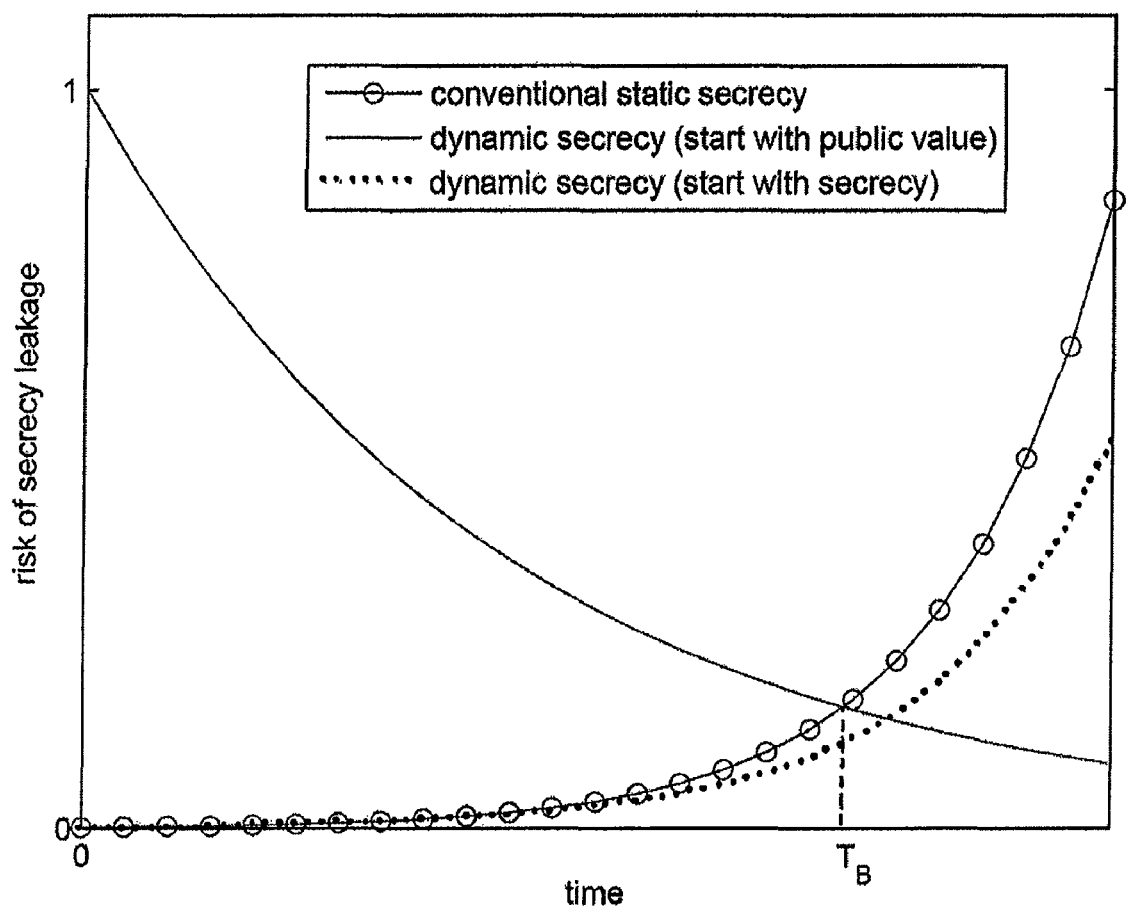
FIG. 11 is a plot of the risk of secrecy leakage as a function of time for different secrecy schemes, including the AET Secrecy Sharing Protocol of the present invention.
Figure 12:
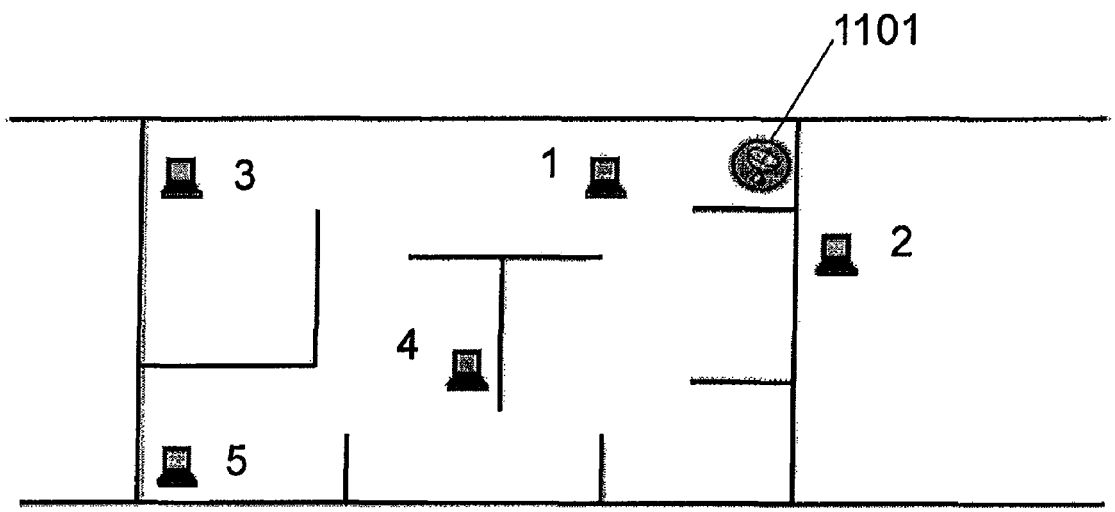
FIG. 12 is a simplified diagram of the environment used to test the Automatic Error Tracing (AET) Secrecy Sharing Protocol of the present invention.

Where:

$\Lambda$ is the set of One Time Frames;

$\Psi$ is the set of One Time Seeds;

$k_i$ is the previously-generated key mask for the prior frame;

$k_{i+1}$ is the current key mask;

a is a random number;

$n_{ts}$ is the size threshold of the set of One Time Seeds $\Psi$;

$fPRNG(\cdot)$ is the interface to the CSPRING;

$\psi$ is the binary number formed by the concatenation of all the secrecy seeds $s_i$ in $\Psi$;

$f_k(\cdot)$ is the per-frame iteration function, selected from iteration functions known in the art;

$f_e(\cdot)$ is the encryption function, selected from encryption functions known in the art;

$f_d(\cdot)$ is the decryption function, selected from decryption functions known in the art; and $l_k$ is the bit length of the per-frame key $k_i$ 3.2.4 Implementation and Test The risk of detecting the secrecy, or secret key, in both the dynamic secrecy scheme of the present invention and a conventional security framework can be modeled and the results can be compared. As a starting point, assume that an adversary can crack and reveal the secret key bits at a certain rate, defined as $R_C$. FIG. 11 qualitatively shows the probability of the secret key being revealed as a function of time for different schemes.

In a conventional security scheme the secrecy is static. Therefore, even if the starting point is perfect secrecy, the probability P(t) of knowing the secrecy increases exponentially over time:

$$P\text{static}(t) = 2^{R_C t - l_k}$$

where $l_k$ is the binary length of the secrecy.

When $R_C t$ is sufficiently close to $l_k$, the secrecy can be found using exhaustive search methods. With current computing technology, the point where $l_k - R_C t \approx 60$ bits is believed to be boundary where a brute force attack becomes feasible.

If $R_L$ is the information loss rate for the adversary, then when $R_L > R_C$, the adversary will continue to lose information about the secrecy. This process is not continuous because the dynamic secrecies are stacked by the use of the XOR function, as described above. Experiments show that the adversary's information loss process can be modeled by an average rate $\alpha \approx R_L - R_C$ for $t \ll l_k / (R_L - R_C)$. When the adversary's knowledge of the secret key is almost certain, the process of XOR'ing with a dynamic secrecy increases the adversary's uncertainty. Therefore, by starting with a public value as the secrecy, the probability of knowing the secrecy can be modeled as an exponentially decreasing function over time.

$$P\text{dynamic}(t) = 2^{-\alpha t}$$

Note that even if $R_L < R_C$, by starting from a perfect secrecy, the dynamic secrecy can support security longer than the conventional system, because $$P\text{dynamic}(t) = 2^{\beta t - l_k},$$

where $\beta < R_C$ is the average rate for the adversary to reveal the secrecy bits with information loss.

As shown in FIG. 11, the dynamic secrecy scheme starting with a public value is more vulnerable than the conventional system for the period of time that occurs before the balance time $T_B$. At this point, $2^{R_C T_B - l_k} = 2^{-\alpha T_B}$ and $$T_B = \frac{l_k}{R_C + \alpha} \approx \frac{l_k}{R_L}.$$

This result suggests a physically testable criterion that can be considered when choosing the security scheme. If the adversary is highly privileged and the information loss is extremely small, $T_B$ is large, and a conventional security mechanism could be less vulnerable than the dynamic security model with the public initial value for a long period of time. However, by combining the dynamic secrecy with the perfect initial secrecy, the security system can be improved.

The Automatic Error Tracing protocol of the present invention was implemented with commercial off-the-shelf personal computers, specifically Dell Inspiron 1300 laptops with Dell 1450 Universal Serial Bus (USB) wireless adaptors, and running the Linux operating system. It should be noted that the invention may be implemented on a wide range of telecommunications systems, and is not limited to personal computers. Personal computers were chosen as the experimental platform because of the relative ease of set-up and to demonstrate that the algorithms of the present invention can be utilized cost-effectively using publicly-accessible technology.

The test environment, a typical indoor room, is shown in FIG. 11. The radar symbol 1101 represents a computer dedicated to broadcasting random frames. The laptop computers labeled with numbers 1 to 5 represent network analyzers or sniffers. During the experiments, the incurred CPU load was constantly less than 0.1% for all the tested parameter sets. The parameter sets were chosen to simulate ordinary office WLAN usages. Each experiment began with the same encryption key used at each laptop computer. Even when the laptop computers were physically located in the same room, no one laptop computer was able to induce another laptop computer's secret key. Over the course of 24 hours, 500 MB random bits had been broadcast. The sniffers' information loss over the course of the 24 hours time span is recorded in Table 2:

TABLE 2

| 1 | 2 | 3 | 4 | 5 | 1-5 |
|---|---|---|---|---|-----|
| 3.7 MB | 5.6 MB | 11.3 MB | 15.5 MB | 14.7 MB | 0.1 MB |

If $l_k=128$ for the 128 bit key used in WLAN, and an adversary deploys 5 sniffers in a room, $$T_B \approx 128 \text{ bit}/(8*100*1024 \text{ bit}/86400 \ s) = 13.5 \ s$$

This suggests that the conventional secret key scheme is safer than the dynamic secrecy scheme only for the first 13.5 seconds. After this short period, the dynamic secrecy scheme had accumulated sufficient information privilege to defend against the adversary.

The dynamic secrecy scheme can also be compared with the manual pre-shared key scheme. Assume there is a diligent administrator who reconfigures the 128 bit secret key for every wireless device every week. Utilizing the dynamic secrecy scheme to defend against the same adversary would be equivalent to hiring this administrator or approximately 122 years for free (100 KB/128 bit*7 days≈122 years). There are surprisingly abundant uncertainties in the adversary's side that can be exploited for the user's secrecy.

The adversary can use more powerful receivers to reduce the information loss, and hope for a better chance to learn the dynamic secrecy. The key point, however, is not the rate racing, but the radical change of the model used to attack the secrecy. To threaten the dynamic secrecy, the adversary must start tapping the network before the first frame is transmitted and must sniff persistently all the time. Moreover, the adversary must rely on perfect luck because every unfortunate information loss could eliminate the prior efforts.

From a system engineering perspective, the secrecy utilization in the conventional security system can be abstracted as a single chain of information flow. Breaking any ring on the chain would compromise the entire system. The dynamic secrecy, however, provides a feedback loop to stabilize the system by continuously changing the entropy of the secrecy. On the other side, the adversary is facing the single point of failure problem because any information loss could be converted into secrecy against him.

As shown then, the present invention is an improvement over existing wireless LAN standards, and provides secure communications between nodes within a wireless network. Even if an adversary had infinite computing power and efficient reversal algorithms, an attempt to break the inventive protocol has an extremely low probability of succeeding. Further, the security of the transmissions increases with the amount of data that is transmitted. Every frame lost by the adversary increases the adversary's uncertainty as to the correct value of the shared symmetric secret key. The dynamic nature of the secret key can also effectively prevent a spoofing attack.

The present invention also offers the advantage of testability. Prior art security efforts are, for the most part, faith-based in that the network administrator cannot show the user whether the wireless network is secure. In contrast, with the present invention the administrator can use a strong receiver to mimic an eavesdropper and probe the environment. This probing result can be broadcasted. Therefore, for any communication pair, the wireless channel security can be measured by calculating the information loss of a potential eavesdropper. Improved channel security can be achieved by having the communication pair exchange more random data before transmitting the actual information.

The protocols of the present invention require little computation overhead. Both entropy encoding and secret key encryption have efficient prior art implementations. In addition, only a few extra frames need to be exchanged to confirm the seed frame indices and the universal hashing parameters. As a result, the computational complexity required to generate a new secret key is negligible.

The claims should not be read as limited to the described order or elements unless stated to that effect. Therefore, all embodiments that come within the scope and spirit of the following claims and equivalents thereto are claimed as the invention.

What is claimed:

1. A computer-implemented method for generating a shared secret key at two or more physical computing devices in a wireless network, comprising:
   (a) encoding one or more frames comprising data at a first physical computing device with random string values and dense parity check codes;
      (i) where the dense parity check codes are selected such that a second physical computing device that receives the one or more frames is able to detect errors in the data; and
      (ii) where the dense parity check codes are further selected such that the second physical computing device is unable to correct the detected errors in the data in the received one or more frames and is thereby unable to recover the data;
   (b) transmitting the one or more frames from the first physical computing device to the second physical computing device;
   (c) receiving the transmitted one or more frames at the second physical computing device;
   (d) examining the dense parity check codes in the received one or more frames at the second physical computing device to detect errors in the data in the received one or more frames;
   (e) in response to detecting an absence of an acknowledgement from the second physical computing device within a predetermined time period when the second physical computing device detects an error in the data in the received one or more frames, (i) retransmitting the one or more frames from the first physical computing device to the second physical computing device and (ii) refraining from storing a random string value from at least one of the one or more retransmitted frames in a first memory location at the first physical computing device;
   (f) in response to receiving an acknowledgement from the second physical computing device when the second physical computing device detects an absence of errors in the data in the received one or more frames, storing at least one random string value from at least one of the one or more transmitted frames in a first memory location at the first physical computing device;

(g) storing the same at least one random string value from the same at least one of the one or more transmitted frames that were not retransmitted in step (f) in a second memory location at the second physical computing device;

(h) applying a hashing algorithm to the random string values stored in the first memory location to generate a first secret key at the first physical computing device; and (i) applying the same hashing algorithm used in step (h) to the random string values stored in the second memory location to generate a second secret key at the second physical computing device, such that the first secret key and the second secret key are the same.

2. The computer-implemented method of claim 1, where the dense parity check codes are equiprobable parity check codes.

3. A computer-implemented method for generating a shared secret key at two or more physical computing devices in a wireless network, comprising:

(a) encoding one or more frames comprising data at a first physical computing device with dense parity check codes;
   (i) where the dense parity check codes are selected such that a second physical computing device that receives the one or more frames is able to detect errors in the data; and
   (ii) where the dense parity check codes are further selected such that the second physical computing device is unable to correct the detected errors in the data in the received one or more frames and is thereby unable to recover the data;

(b) transmitting the one or more frames from the first physical computing device to the second physical computing device;

(c) receiving the transmitted one or more frames at the second physical computing device;

(d) examining the dense parity check codes in the received one or more frames at the second physical computing device to detect errors in the data in the received one or more frames;

(e) in response to detecting an absence of an acknowledgement from the second physical computing device within a predetermined time period when the second physical computing device detects an error in the data in the received one or more frames, (i) retransmitting the one or more frames from the first physical computing device to the second physical computing device and (ii) refraining from storing a random string value from at least one of the one or more retransmitted frames in a first memory location at the first physical computing device;

(f) in response to receiving an acknowledgement from the second physical computing device when the second physical computing device detects an absence of errors in the data in the received one or more frames, storing at least a portion of at least one of the one or more transmitted frames at the first physical computing device;

(g) storing the same portion from the same at least one of the one or more transmitted frames that was not retransmitted in step (f) at the second physical computing device;

(h) applying a hash function to the stored frame portion at the first physical computing device to generate a first secret key at the first physical computing device; and (i) applying the same hash function used in step (h) to the stored frame portion at the second physical computing device to generate a second secret key at the second physical computing device, such that the first secret key and the second secret key are the same.

4. A system for generating a shared secret key at two or more physical computing devices in a wireless network, comprising:

a first physical computing device comprising a wireless network adapter, for
   encoding one or more frames comprising data with dense parity check codes, where the dense parity check codes are selected such that a second physical computing device that receives the one or more frames is able to detect errors in the data, and where the dense parity check codes are further selected such that the second physical computing device is unable to correct the detected errors in the data in the received one or more frames and is thereby unable to recover the data,
   transmitting the one or more frames to the second physical computing device,
   in response to detecting an absence of an acknowledgement from the second physical computing device within a predetermined time period when the second physical computing device detects an error in the data in the received one or more frames, (i) retransmitting the one or more frames to the second physical computing device and (ii) refraining from storing a random string value from at least one of the one or more retransmitted frames,
   in response to receiving an acknowledgement from the second physical computing device when the second physical computing device detects an absence of errors in the data in the received one or more frames, storing at least a portion of at least one of the one or more transmitted frames, and
   using the stored frame portion to generate a first secret key; and the second physical computing device comprising a wireless network adapter, for
   receiving the one or more encoded frames from the first physical computing device,
   examining the dense parity check codes in the received frames to detect errors in the data in the received frames,
   transmitting an acknowledgement to the first physical computing device if no errors were detected in the data in the received data frames,
   storing the same portion from the same at least one frame that was not retransmitted, and
   using the stored frame portion to generate a second secret key;

where the first secret key and the second secret key are the same.

5. The system of claim 4, where the dense parity check codes are equiprobable parity check codes.

6. The system of claim 4, where a hashing algorithm is applied to the stored frame portion at the first physical computing device to generate a first secret key.

7. The system of claim 4, where a hashing algorithm is applied to the stored frame portion at the second physical computing device to generate a second secret key.

8. The system of claim 4, where a privacy amplification function is applied to the stored frame portion at the first physical computing device to generate a first secret key.

9. The system of claim 8, where the frames are further encoded with random string values at the first physical computing device, and the privacy amplification function is applied to the random string values.

10. The system of claim 4, where a privacy amplification function is applied to the stored frame portion at the second physical computing device to generate a second secret key.

11. The system of claim 10, where frames are further encoded with random string values at the first physical computing device, and the privacy amplification function is applied to the random string values.

12. The computer-implemented method of claim 3, where the dense parity check codes are equiprobable parity check codes.

13. The computer implemented method of claim 1, wherein in response to receiving the transmitted one or more frames at the second physical computing device:

detecting an error criteria in the data of the received one or more frames;

in response to detecting an absence of errors in the data in the received one or more frames, detecting a status of a re-transmission counter associated with the received one or more frames;

in response to the re-transmission counter indicating that the one or more frames has been received from the first physical device more than once, refraining from storing the random string value from at least one of the one or more transmitted frames in the first memory location at the second physical computing device, and in response to the re-transmission counter indicating that the one or more frames has been received from the first physical device only once, storing the same portion from the same at least one of the one or more transmitted frames that was not retransmitted in step (f) at the second physical computing device comprises storing the random string value from at least one of the one or more transmitted frames in the first memory location at the second physical computing device; and in response to detecting an error in the data in the received one or more frames, discarding the one or more frames.

14. The computer implemented method of claim 3, wherein in response to receiving the transmitted one or more frames at the second physical computing device:

detecting an error criteria in the data of the received one or more frames;

in response to detecting an absence of errors in the data in the received one or more frames, detecting a status of a re-transmission counter associated with the received one or more frames;

in response to the re-transmission counter indicating that the one or more frames has been received from the first physical device more than once, refraining from storing the random string value from at least one of the one or more transmitted frames in the first memory location at the second physical computing device, and in response to the re-transmission counter indicating that the one or more frames has been received from the first physical device only once, storing the same portion from the same at least one of the one or more transmitted frames that was not retransmitted in step (f) at the second physical computing device comprises storing the random string value from at least one of the one or more transmitted frames in the first memory location at the second physical computing device; and in response to detecting an error in the data in the received one or more frames, discarding the one or more frames.

* * * * *